(12) United States Patent
Kadayam et al.

(10) Patent No.: US 8,131,755 B2
(45) Date of Patent: *Mar. 6, 2012

(54) SYSTEM AND METHOD FOR RETRIEVING AND ORGANIZING INFORMATION FROM DISPARATE COMPUTER NETWORK INFORMATION SOURCES

(75) Inventors: Sundar Kadayam, Blue Ash, OH (US); Gregory J. Bishop, Delhi Township, OH (US); William A. Miller, Delhi Township, OH (US); Viral Vora, West Chester, OH (US)

(73) Assignee: SAP America, Inc., Newtown Square, PN ( * ) Notice: Subject to any disclaimer, the term of this patent is extended or adjusted under 35 U.S.C. 154(b) by 235 days.

This patent is subject to a terminal disclaimer.

(21) Appl. No.: 12/494,181

(22) Filed: Jun. 29, 2009

(65) Prior Publication Data

US 2009/0265346 A1    Oct. 22, 2009

Related U.S. Application Data

(63) Continuation of application No. 10/378,554, filed on Mar. 3, 2003, now Pat. No. 7,567,953.

(60) Provisional application No. 60/360,754, filed on Mar. 1, 2002.

(51) Int. Cl.
*G06F 17/30* (2006.01)
(52) U.S. Cl. ........................................ 707/771; 707/722
(58) Field of Classification Search .................. 707/771, 707/754, 722
See application file for complete search history.

(56) References Cited

U.S. PATENT DOCUMENTS

| | | | |
|---|---|---|---|
| 5,628,011 A | 5/1997 | Ahamed et al. | |
| 5,768,580 A | 6/1998 | Wical | |
| 5,859,972 A | 1/1999 | Subramaniam et al. | |
| 5,940,821 A | 8/1999 | Wical | |
| 6,028,605 A | 2/2000 | Conrad | |
| 6,038,560 A | 3/2000 | Wical | |
| 6,175,830 B1 | 1/2001 | Maynard | |
| 6,233,586 B1 | 5/2001 | Chang et al. | |
| 6,263,342 B1 | 7/2001 | Chang et al. | |
| 6,272,488 B1 | 8/2001 | Chang et al. | |
| 6,370,541 B1 | 4/2002 | Chou et al. | |
| 6,446,083 B1 | 9/2002 | Leight et al. | |
| 6,463,430 B1 * | 10/2002 | Brady et al. | 1/1 |
| 6,466,933 B1 | 10/2002 | Huang et al. | |

(Continued)

OTHER PUBLICATIONS

Casasola et al., "Intelligent Information Agents for the World Wide Web," Information and Telecommunication Technology Center, Technical Report: ITTC-FY97-11100-1, University of Kansas, 1997, 15 pp.

(Continued)

*Primary Examiner* — Jean M Corrielus
(74) *Attorney, Agent, or Firm* — Mintz, Levin, Cohn, Ferris, Glovsky & Popeo, P.C.

(57) ABSTRACT

A computer implemented method for accessing information from a set of searchable information sources includes analyzing a search query to determine subject matter of the query. A subset of information sources is selected from the set of information sources based upon the subject matter of the query. Analyzing utilizes at least two different criteria for deriving the subject matter of the query. One criteria includes comparing the search query against a set of entity lists. Another criteria includes comparing the search query against a knowledge-base.

16 Claims, 19 Drawing Sheets

U.S. PATENT DOCUMENTS

| | | |
|---|---|---|
| 6,484,166 B1 | 11/2002 | Maynard |
| 6,513,027 B1 | 1/2003 | Powers et al. |
| 6,578,046 B2 | 6/2003 | Chang et al. |
| 6,647,383 B1 | 11/2003 | August et al. |
| 6,650,998 B1 | 11/2003 | Rutledge et al. |
| 6,665,681 B1 | 12/2003 | Vogel |
| 6,728,704 B2 | 4/2004 | Mao et al. |
| 6,768,999 B2 | 7/2004 | Prager et al. |
| 6,792,416 B2 | 9/2004 | Soetarman et al. |
| 6,859,937 B1 | 2/2005 | Narayan et al. |
| 6,868,525 B1 | 3/2005 | Szabo |
| 6,895,407 B2 | 5/2005 | Romer et al. |
| 6,920,448 B2 | 7/2005 | Kincaid et al. |
| 6,922,691 B2 | 7/2005 | Flank |
| 6,941,294 B2 | 9/2005 | Flank |
| 6,944,611 B2 | 9/2005 | Flank et al. |
| 6,994,612 B2 | 2/2006 | Cron |
| 7,031,961 B2 | 4/2006 | Pitkow et al. |
| 7,085,771 B2 | 8/2006 | Chung et al. |
| 7,113,939 B2 | 9/2006 | Chou et al. |
| 7,177,879 B2 | 2/2007 | Flank et al. |
| 7,181,438 B1 | 2/2007 | Szabo |
| 7,272,833 B2 | 9/2007 | Yaung |
| 7,343,371 B2 | 3/2008 | Ibuki |
| 7,418,444 B2 | 8/2008 | Flank et al. |
| 7,519,605 B2 | 4/2009 | Vailaya et al. |
| 2001/0037332 A1 | 11/2001 | Miller |
| 2001/0039592 A1 | 11/2001 | Carden |
| 2002/0120685 A1 | 8/2002 | Srivastava et al. |
| 2003/0120653 A1 | 6/2003 | Brady et al. |
| 2003/0212673 A1* | 11/2003 | Kadayam et al. ............... 707/3 |
| 2004/0100510 A1 | 5/2004 | Milic-Frayling et al. |
| 2005/0288920 A1 | 12/2005 | Green et al. |
| 2005/0289168 A1 | 12/2005 | Green et al. |
| 2006/0200462 A1* | 9/2006 | Kadayam et al. ............... 707/5 |
| 2006/0259476 A1* | 11/2006 | Kadayam et al. ............... 707/3 |
| 2009/0265346 A1* | 10/2009 | Kadayam et al. ............... 707/5 |
| 2011/0119253 A1* | 5/2011 | Grabarnik et al. ............ 707/722 |

OTHER PUBLICATIONS

Etzioni et al., "Digital Libraries Research," Department of Computer Science & Engineering, University of Washington, http://www.cs.washington.edu/research/diglib, Jan. 1, 1999, 2 pp.

Fan et al., "Adaptive Agents for Information Gathering from Multiple, Distributed Information Sources," Proceedings of the 1999 AAAI Symposium on Intelligent Agents in Cyberspace, Stanford University, http://www.ittc.ku.edu/~sgauch/papers/AAAI99.html, Mar. 1999, 7 pp.

Glover et al., Architecture of a Metasearch Engine that Supports User Information Needs, Proceedings of the Eighth International Conference on Information Knowledge Management, 1999, pp. 210-216.

Sugiura et al., "Query Routing for Web Search Engines: Architecture and Experiments," Proceedings of the 9th International World-Wide Web Conference, Foretec Seminars, Inc., 2000, http://www9.org/w9cdrom/139/139.html, Feb. 21, 2003, 18 pp.

Zhu et al.. "Ontology-Based Web Site Mapping for Information Exploration," in Proceedings of the 8 th International Conference on Information Knowledge Management, 1999, pp. 188-194.

\* cited by examiner

FIG. 4

"Source Taxonomy"

Searchable Sources are organized in a "Source taxonomy" with a hierarchy of Agents > Categories > Engines An "Engine" corresponds to a "Broker" or a single searchable source of information

```
<agents>
  <agent sequence="0" id="40">Arts and Humanities</agent>
  <agent sequence="18" id="7">Entertainment</agent>
  <agent sequence="2" id="9">News</agent>
  <agent sequence="3" id="4">Business</agent>
  <agent sequence="1" id="20">Finance</agent>
  <agent sequence="5" id="6">Reference</agent>
  <agent sequence="6" id="13">Career</agent>
  <agent sequence="4" id="41">Government</agent>
  <agent sequence="8" id="39">Science</agent>
  <agent sequence="9" id="36">Developer Toolbox</agent>
  <agent sequence="7" id="5">░░░░</agent>
  <agent sequence="11" id="35">Sports</agent>
```

```
<agents>
  <id>5</id>
  <title>Health</title>
  <path>Home/Health</path>
  <categories>
    <category default="True" sequence="0" id="12" origin="user">Health News</category>
    <category default="True" sequence="0" id="129" origin="user">Health Publications</category>
    <category default="True" sequence="0" id="212" origin="user/teaserseq=0">░░░░</category>
    <category default="False" sequence="0" id="126" origin="user/teaserseq=2">Alternative Medicines</category>
```

```
  <category>
    <id>61</id>
    <title>Health Tips</title>
    <description>
      Enter keywords or phrases to retrieve consumer health advice from one or more search engines below.
    </description>
    <engines>
      <engine default="True" sequence="0" id="871">░░░░</engine>
      <engine default="True" sequence="0" id="551">AskOrWOO</engine>
      <engine default="True" sequence="0" id="212">Health00</engine>
      <engine default="True" sequence="0" id="251">Intel00</engine>
      <engine default="True" sequence="0" id="1486">Medical00</engine>
      <engine default="True" sequence="0" id="895">MedicinePLUS</engine>
      <engine default="True" sequence="0" id="390">Parent01</engine>
      <engine default="True" sequence="0" id="1492">Safety00</engine>
```

| | se_category(4) | |
|---|---|---|
| | = id | Abc Text |
| | 1 107 | Maps |
| | 2 166 | Travel Guides |
| | 3 234 | Almanacs |
| | 4 48 | Encyclopedias |

| | se_category(3) | |
|---|---|---|
| | = id | Abc Text |
| | 1 161 | Tennis |
| | 2 11 | Sports News |
| | 3 184 | Sports Directories |

| | se_category(5) | |
|---|---|---|
| | = id | Abc Text |
| | 1 34 | Finance Discussions |
| | 2 120 | Financial Tips |
| | 3 99 | Company Profiles |
| | 4 100 | SEC Filings |
| | 5 121 | Mutual Funds |

174 lists/places — se_categories
175 lists/tennis — se_categories
176 lists/ticker_symbols — se_categories

Entity List-to-Source Mapping

"Ticker Symbols" are mapped to specialized search categories namely, "Finance Discussions", "Finance Tips", "Company Profiles" etc.

"Places" are mapped to specialized search categories namely, "Maps", "Travel Guides", "Almanacs", "Encyclopedias" etc.

```
<title>Health Questions and Answers</title>
<id>74</id>
<engines>
  <engine>
    <engine>Doctor00</engine>
    <weight>0.45</weight>
  </engine>
  <engine>
    <engine>Health00</engine>
    <weight>0.52</weight>
  </engine>
  <engine>
    <engine>Intel00</engine>
    <weight>0.54</weight>
  </engine>
  <engine>
    <engine>Lookit00</engine>
    <weight>0.5</weight>
  </engine>
  <engine>
    <engine>MAYOHe00</engine>
    <weight>0.93</weight>  — 57
  </engine>
  <engine>
    <engine>Nation00</engine>
    <weight>0.51</weight>
  </engine>
  <engine>
    <engine>Parent00</engine>
    <weight>0.59</weight>
  </engine>
  <engine>
    <engine>Parent01</engine>
    <weight>0.52</weight>
  </engine>
```

58

Source Ranking

Here, the "Mayo Health" database source has been rated as the best performing by the system on the subject of "Health"

FIG. 11

```
url=http://www.intelihealth.com
Name=InteliHealth
NumberofResults=20
Connections=25
SupportQuote=1
CommonQuery-criteria-fitness DefaultSupport=1
QueryString1=http://www.intelihealth.com/cgi-bin/avsearch.mpl?index=ICN&nxt=1&adv=t&WEB_
HOME=%2FIH%2F&WEB_HOST=http%3A%2Fwww.intelihealth.com&MIVAL=ihtIH&P=%7Ebr%2CIHW
St%2C408%7C%7Er%2CWSIHW000%7C%7EbX2C*X7C&T=408&ST=408&submitbutton.x=5&submitb
&
QueryTerms=criteria=queryterm
Method=GET
Prefix=
Regex=[\d]\)\s<A HREF=([A>]+)><B>(.*?)<VB><VA. *?<BR>(.*?)<BR><FONT>\ SIZE=-1>
Groups=1=Url;2=Title;3=Summary
NumGroups=3

PhraseSupport=1
PhraseQueryString1=http://www.intelihealth.
T&WEB_HOME=%2FIH%22F&WEB_HOST
%7CX7Est%2C408%7C%7Er%2CWSIHW0
N.y=10&
PhraseQueryTerms=criteria=queryterm
PhaseMethod=GET
PhrasePrefix=
PhraseRegex=[\d]\)\s<A HREF=([A>]+)><B
PhraseGroups=1=Url;2=Title;3=Summary
PhraseNumGroups=3

BooleanSupport=1
BooleanQueryString1=http://www.intelihealth.com/cgi-bin/avsearch.mpl?index=ICN&nxt=1adv
=t&WEB_HOME=%2FIH%2F&WEB_HOST=http%3A%2F%2Fwww.intelihealth.com&MIVAL=ihtIH&P
W%7C%7Est%2C408%7C%7Er%2CWSIHW000%7C%7Eb%2C*%7C&T=408&ST-
408&submitbutton.x=5&submitbutton.=10&
BooleanQueryTerms-criteria-queryterm
BooleanMethod=GET
BooleanPrefix=
BooleanRegex=[\d]\)\s<A HREF=([A>]+)><B>(.*?)<VB><VA>. *?<BR>(.*?)<BR><FONT\ SIZE=-1>
BooleanGroups=1=Url;2=Title;3=Summary
BooleanNumGroups=3

Mappings=AND=AND;%26=AND;OR=OR;%7C=OR;NOT=NOT;%21=NOT;NEAR=NEAR;%7E=NEAR
```

Broker Definition

A Broker is represented as a single data file with information to a) communicate with a searchable source, b) send queries in the native form to it, c) interpret results that it returns, and d) navigate through multiple 'pages' of the result set

*FIG. 12*

|         | Source 1 | Source 2 | ... | Source n |
|---------|----------|----------|-----|----------|
| User 1  | <Session Details> | <Session Details> | ... | <Session Details> |
| User 2  | <Session Details> |          |     |          |
| ...     |          |          |     |          |
| User m  | <Session Details> |          |     |          |

Session Details

Active Session Management involves maintaining Session details for each user performing a search against each secure source Session Details include:
- Cookies
- Session Parameters
- Session Ids
- Session State etc.

SYSTEM AND METHOD FOR RETRIEVING AND ORGANIZING INFORMATION FROM DISPARATE COMPUTER NETWORK INFORMATION SOURCES

CROSS REFERENCE TO RELATED APPLICATIONS

This application is a continuation of U.S. patent application Ser. No. 10/378,554 filed on Mar. 3, 2003 now U.S, Pat. No. 7,567,953, which claims the benefit from U.S. Provisional Patent Application No. 60/360,754 filed Mar. 1, 2002; the contents of each are incorporated herein by reference.

BACKGROUND

The present invention is a computerized system and method for searching through and retrieving information from a plurality of information sources; and more particularly, the present invention is an enterprise-scale system and method for searching for and retrieving information from a plurality of disparate electronic information sources within a large computer network and/or from the Internet.

A federated search system, by its very definition, distributes search queries in real-time to the information sources selected for querying. In a very large scale federated search system, one that involves hundreds or even thousands of information sources, the method of real-time querying of large numbers of information sources becomes impractical. It is desired to bring some intelligence to the search process that would permit an appropriate subset of the information sources to be selected for querying rather than all the available sources.

Secure information sources within a federated search system also pose a unique set of challenges. At a fundamental level, the federated search system should be able to proxy the user credentials to a secure information source (i.e., make it appear to the secure information source that the user was natively interacting with it). This is complicated, however, by the following circumstances: multiple secure information sources could be in the searching mix at the same time; each secure information source could require different methods for handling security (this can include LDAP, HTTP-basic authentication, HTTPS, cookie-based authentication using custom forms, proprietary single-sign-ons, etc.); and the system should transparently handle the security log-ins, parameters and protocols for multiple users, possibly accessing multiple secure information sources at the same time.

Finally, in a large federated search system, a reasonable effort could involve manually creating brokers (sometimes referred to as "wrappers") to define and interface between the system and the respective multiple searchable information sources accessed by the system. It is desired to reduce user interaction needed to create and maintain the brokers by providing an automated, or semi-automated broker generation capability.

SUMMARY

A computer implemented method for accessing information from a set of searchable information sources includes analyzing a search query to determine subject matter of the query. A subset of information sources is selected from the set of information sources based upon the subject matter of the query. Analyzing utilizes at least two different criteria for deriving the subject matter of the query. One criteria includes comparing the search query against a knowledge-base where the knowledge base includes a taxonomy of subject matters and a set of terms for at least some of the respective subject matters. The set of terms represents information likely to be found in the respective subject matters. At least portions of the search query are compared against the sets of terms in the knowledge base to determine the respective subject matters of matching terms. Another criteria includes comparing the search query against a knowledge-base, where the knowledge base includes a taxonomy of subject matters and a set of terms for at least some of the respective subject matters. The set of terms represents information likely to be found in the respective subject matters. At least portions of the search query are compared against the sets of terms in the knowledge base to determine the respective subject matters of matching terms.

BRIEF DESCRIPTION OF THE DRAWINGS

FIG. 4 is an example screen shot of the exemplary embodiment illustrating intelligent query routing to subsets of information sources with general search results;

FIG. 5 is an illustration of a source taxonomy, an organization of searchable information sources in XML format, of the exemplary embodiment;

FIG. 9 is an illustration of a structure of mapping entity lists to information sources, maintained in an XML file, of the exemplary embodiment;

FIG. 11 is an illustration of the information performance source ranking structure according to the exemplary embodiment;

FIG. 12 is an example output representation of a broker definition generated by the broker-definition tool according to the exemplary embodiment;

FIG. 14 is an illustration of a session-details database utilized by the exemplary embodiment for secure information source handling;

FIG. 16 is an example screen shot of the exemplary embodiment illustrating an extraction testing stage of the broker-definition tool;

FIG. 18 is an example screen shot of the exemplary embodiment illustrating another testing stage of the broker-definition tool; and FIG. 19 is an example screen shot of the exemplary embodiment illustrating secure source handling stage of the broker-definition tool.

DETAILED DESCRIPTION

Figure 1:
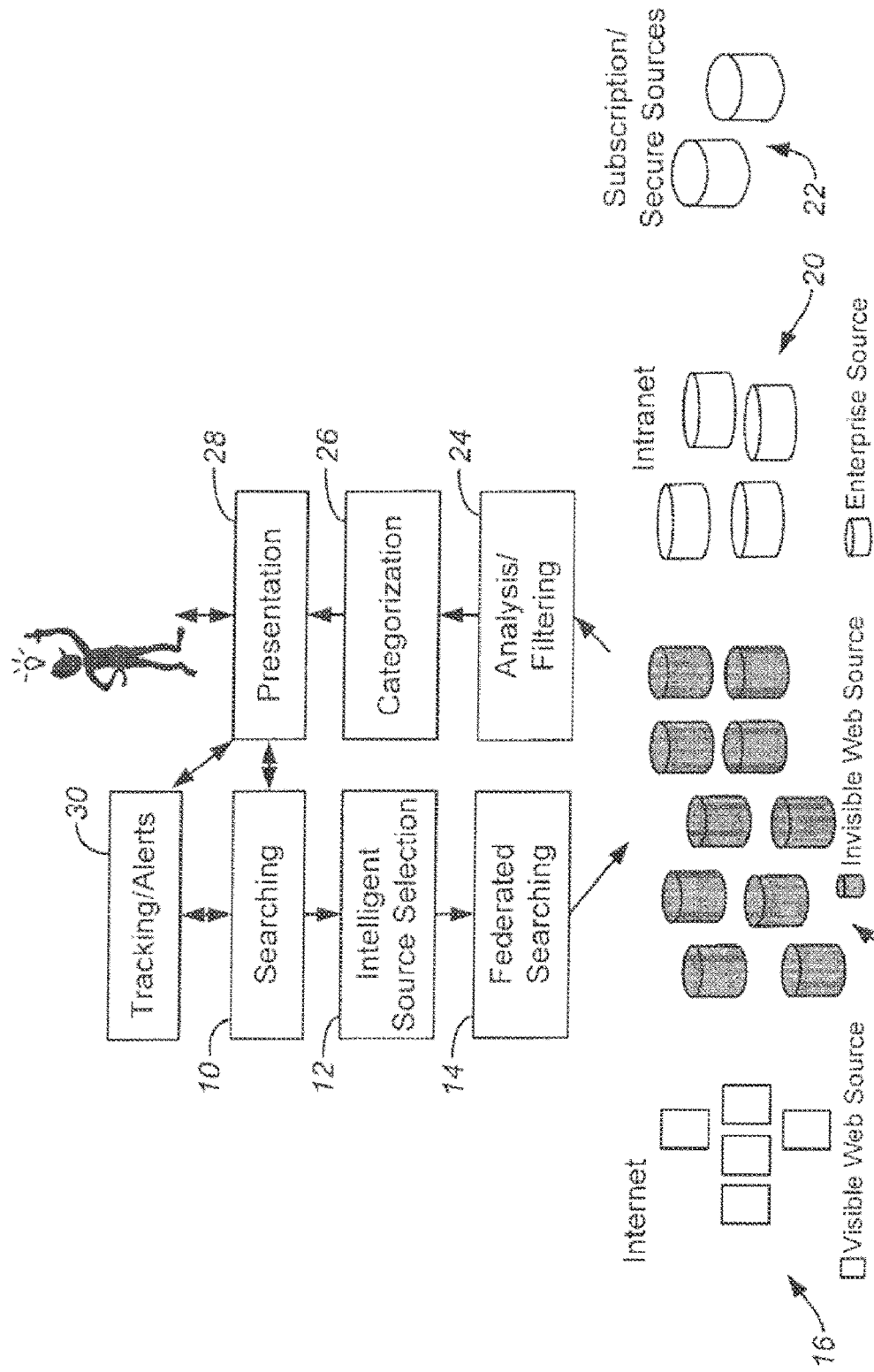
FIG. 1 is a general block diagram of the system architecture of the exemplary embodiment of the present invention.

The present invention provides an enterprise-scale system and method for searching and retrieving electronic information from disparate electronic information sources within a large organization (an intranet) and/or from the Internet. At the heart of the system is a "federated search" architecture and system that enables a single search query from a user to be delivered (preferably, in real-time) to various searchable information sources.

As used herein, "information source", "source" and "searchable information source" pertain to searchable information sources accessible over a data network such as, for example, the World Wide Web or a proprietary computer network. The searchable information sources will typically be search engines, or may include search engines or search capabilities associated therewith that provides the ability for a user to search the searchable information source for desired information. It is not necessary, however, for the searchable information source to have its own search capabilities embedded therein or associated therewith, as such search capabilities can be provided elsewhere. Examples of such searchable information sources accessible over the World Wide Web include, MSN.com, LYCOS.com, TEOMA.com, Intellihealth.com, WebMD.com, WSJ.com, etc. Likewise, "secure information source", "secure source" and "secure searchable information source" pertain to such searchable information and sources that require certain security credentials (such as passwords, for example) to access and/or perform searches therein/therewith.

As used herein, "search query" and "query" pertain to an expression of the and information that a user or system wishes or requests to search for in one or more searchable information sources. While the expression will typically be in the form of a term or phrase typed into a field of an electronic form by the user, it is within the scope of the invention that the expression be automatically generated and presented to the searchable information source(s) and it is within the scope of the invention that the expression be pre-stored and presented to the searchable information source(s).

As used herein, "document" means electronic body or collection of information or data that the user or system will typically be provided access to by the searchable information sources) in the search result(s) provided by the searchable information sources) (although some searchable information sources only identify the documents, without providing access). This is typically the body or collection of information or data that the user/system is ultimately seeking in the searching process.

As used herein, the act of "searching" an information source or within an information source, and the act of "searching by" an information source pertains to the act of applying the search query to one or more of the searchable information sources to produce search results, which may or may not provide the user/system access to documents; but which will usually provide at least the identity of document(s) if the search is successful. It is to be understood that the present invention is not limited to any specific searching algorithm or technique.

As used herein, the act of "comparing" or "matching" a search query (or any other expression of information/data) against another expression of information/data pertains to the use of any available techniques and/or algorithms to perform a lexical comparison of the expression (or a portion of the expression) against terms, phrases or other expressions of information or data in the other entity. The results of this comparison often do not necessitate exact matches to be considered "successful"; and, thus, often include confidence scores with the results that indicate the relative confidence or closeness of the comparison. While the exemplary embodiments herein often refer to lexical comparisons, it is within the scope of the invention that alternate techniques/algorithms be used when the comparison is not a language-based comparison.

FIG. 1 provides a functional flow diagram representation of the federated search system deployed according to an exemplary embodiment of the present invention. The searching function 10 provides a configurable, hierarchically organized group of information sources, described below, to users to fulfill different information needs and requests from the multiple groups of users. A simple search involves taking search query terms from the user to conduct the search. An advanced search enables users to select multiple groups of sources, or multiple sources within a group, and to control many settings, including the depth of the search, analysis options, and time-outs. Personalized searching preferences are stored for each user by the system. Searches initiated in the system are conducted in real-time, and results are displayed in configurable web page format or in XML format.

In the intelligent source selection function 12, a user's search query is analyzed to determine the subject matter corresponding to the user's query. Upon identifying this subject matter of the search query, a sub-set of information sources can be isolated from the vast body of information sources to perform the search. For example, a search for "pancreatic cancer treatment protocol" can be determined by the system to be broadly based on the subject-heading of "health", and more specifically, on the specific subjects of "diseases and conditions", and "endocrinal disorders". The sub-set of information sources is selected by consulting an information source hierarchy, or subject-to-source map, to find the best sources for the identified subject matters. These best performing sources can automatically be given preference for searching in real-time in addition to user-selected information sources, or these best sources can be offered as recommendations to the user for performing further related searches.

The federated searching function 14 implements the actual real-time, distributed searching mechanism. This function receives as inputs the search query parameters and other optional advance settings, and accesses one or more groups of information sources to perform the federated searching in all or certain subsets of the information sources. Information sources from which the real-time federated searching may be conducted include visible Web sources 16 accessible over the Internet, invisible Web sources 18 accessible over the Internet, enterprise sources 20 (private information sources accessible by the system over the system's Intranet, for example), and subscription sources 22, which may be accessible over the Internet or through separate network connections. Each information source in the sub-set of selected information sources is searched by the system in real-time, with user credentials being transparently proxied, if necessary, to each secure source 22. Multi-processing and multi-threading mechanisms are implemented for scalability to large numbers of concurrently searched sources well as large numbers of concurrent users searching with the system. This federated searching function 14 translates a user's search query into the native forms required for each information source, communicates with each information source using native protocols and methods, navigates through one or more search result sets from each source, extracts search result records including uniquely defined fields of information for each of the records from each source, normalizes the results, removes duplicates, and performs composite relevance ranking based upon specified, configurable relevance ranking criteria. An XML result stream is produced that can be operated upon by other components in the system.

The analysis/filtering function 24 is optionally triggered by the user to perform real-time retrieval and analysis of the full-text contents (documents) for each result from the composite result set delivered from the federated searching function 4. Each "document" is retrieved from the corresponding information source in the essential text content along with relevant meta-data is extracted from it. This function 24, in essence, "converts" content from different document formats like Adobe PDF, Microsoft Word, etc. to native text. The text and meta-data content corresponding to each result record is then passed through a real-time filtering component that takes one or more search queries representing the user's input and then determines the strength of match of the result to the user's need. In this analysis/filtering function 24, the passages (sentences or paragraphs) from the documents matching the user's query are extracted and ranked to determine the strength of the match and to compute a native "analysis score" which is used for relevance ranking purposes. Next, a dynamic summary is composed from the extracted passages for each matching document. Each result record is then enhanced with additional meta-data including an "analysis score", an updated relevance score, a dynamic summary snippet, as well as additional information when the result document doesn't match the user's query.

The categorization function 26 categorizes the results from the federated searching (and, optionally, the analysis/filtering function 24) into a configured subject taxonomy. An administrator first creates a taxonomy of subjects representing a given information domain, provides example documents for each subject, and runs an administrative tool to train the taxonomy and create a model that is used for the real-time categorization of the search result documents. During searching, the categorization process involves deriving a "fingerprint" (important terms representative of a respective content of the record, which can be phrases or individual words) from each result record and matching it with the taxonomy model configured for use in the system. The best matching subject is determined for each result record, and is tagged as additional meta-data in the result record. In the presentation function 28, the results from the previous steps of searching 10, analysis/filtering 24, and categorization 26 are received in XML. A standards-based template mechanism allows the results to be displayed rapidly in any desired format. Information can be organized into multiple views such as "by relevance," "by source", and "by concept." The relevance view orders the results at decreasing order based upon the "relevance score". The source view provides a graphical tree-view of the results organized by the sources from which they came from. And the concept view provides a graphical, tree-view of the results, organized into the matching taxonomy of subjects from the categorization process 26.

The tracking/alerts function 30 is an optional function that may be set up to run periodic searches for a given search query or set of search queries automatically and to alert the user when a desired set of results are obtained from the periodic searches, or when any results are obtained.

Figure 2:
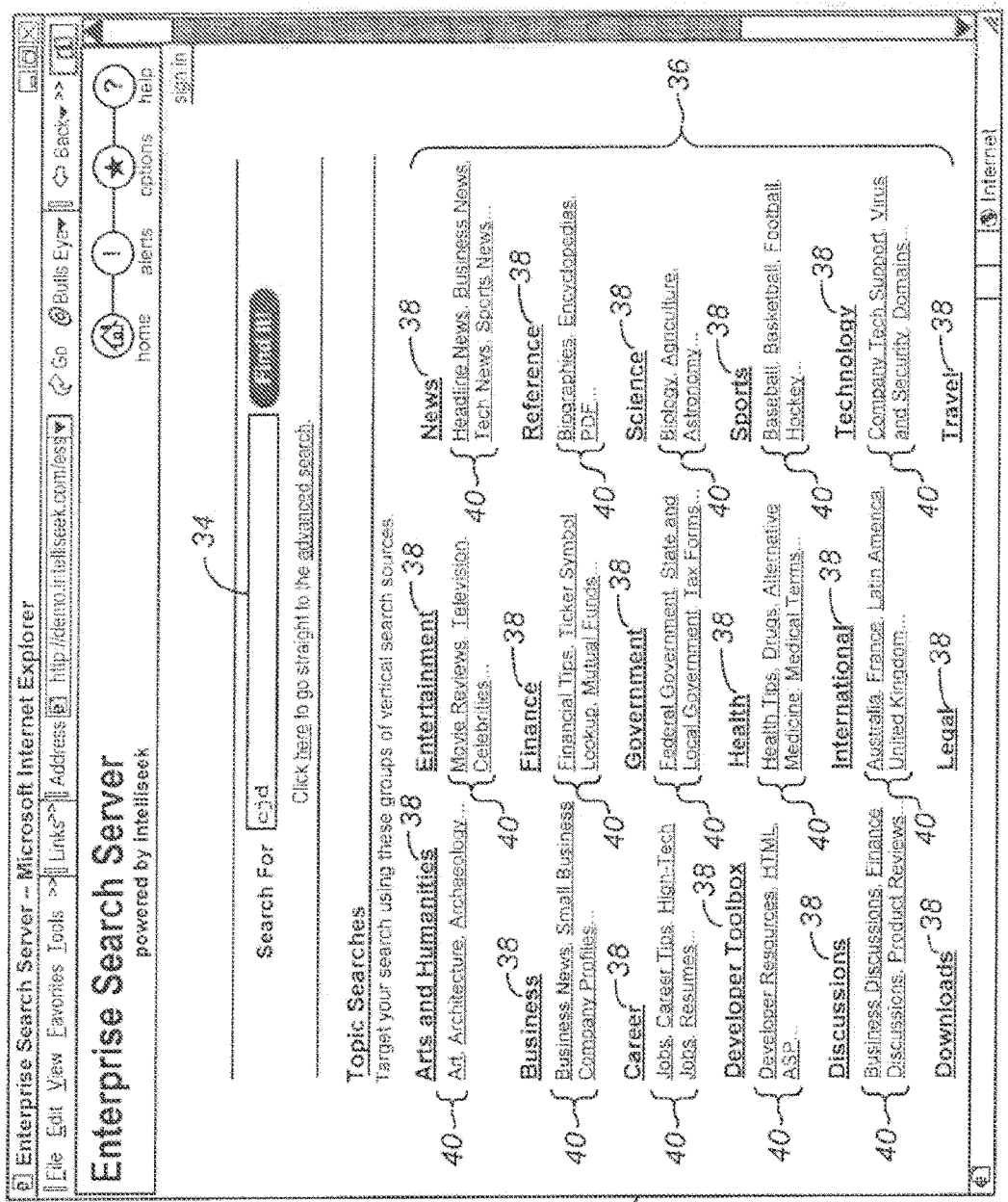
FIG. 2 is an example screen-shot illustrating the universal search interface of the exemplary embodiment.

Referring to FIG. 2, an example screen display 32 of initial searching screen provides a field 34 into which a searcher can enter a search query. If the user enters the search query in this field, the exemplary embodiment will perform an automatic search as described in further detail below. Optionally, prior to entering a search query, the user can select specific subjects from the source taxonomy 36 (provided in this exemplary embodiment in the form of hyperlinks) to allow the search to be performed within narrow sub-sets of information sources specific to the subject matter of interest. The taxonomy 36 in the exemplary embodiment includes an upper level of subjects 38 that generally define a subject matter and a second tier of more specific subject matters 40. As will be discussed in further detail below, upon selecting an identified subject (hyperlink) in the source taxonomy 36 displayed in the window 32, the system will then perform the searching in the specific sub-set of sources represented by the subject heading/subject 38/40 selected by the user.

Figure 3:
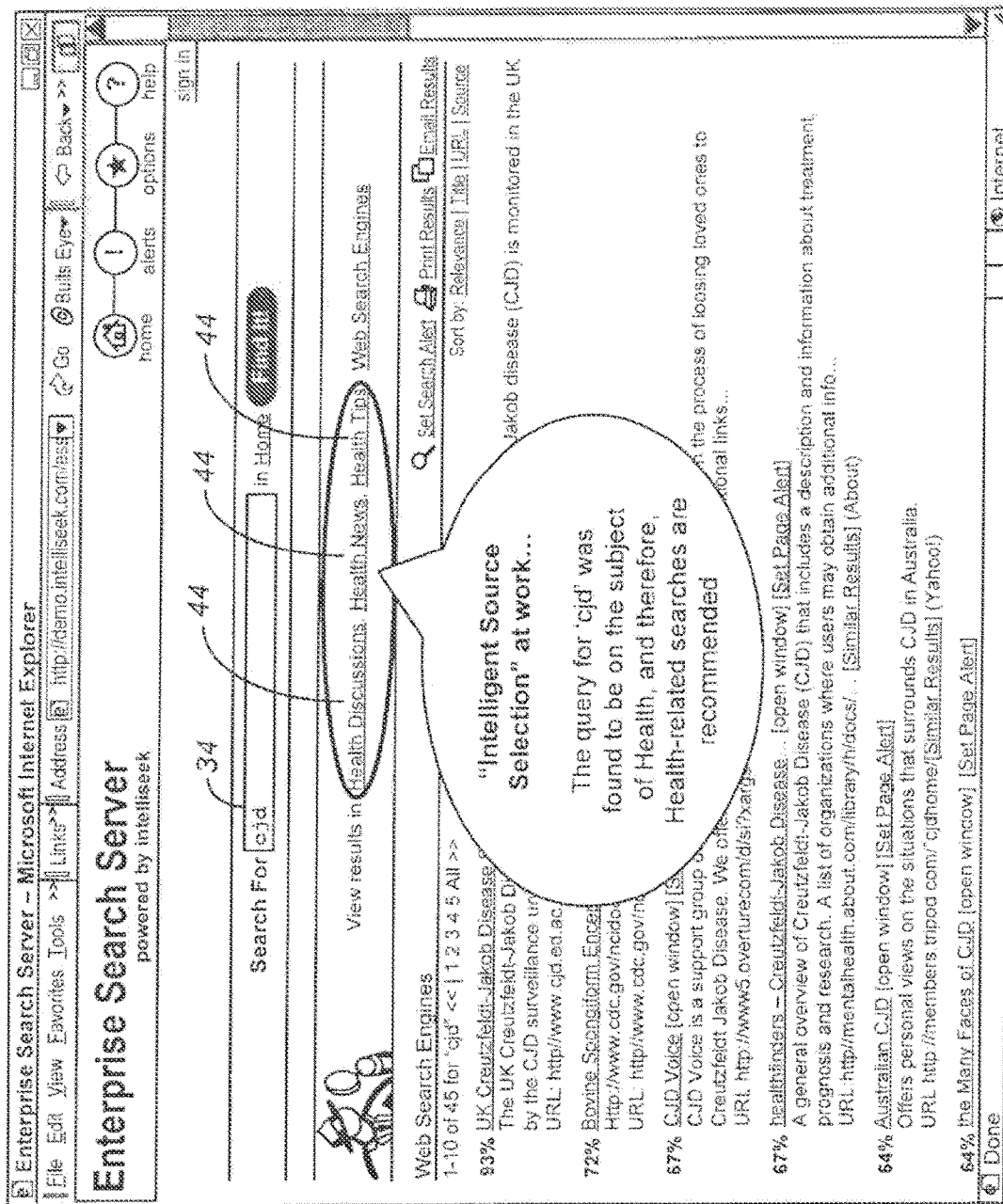
FIG. 3 is an example screen-shot of the exemplary embodiment illustrating intelligent source selection capabilities combined with general search results.

As shown in FIG. 3, an example screen shot 42 is provided that illustrates the results of performing a general search of the exemplary embodiment using the search query of "cjd". In the exemplary embodiment, if no specific subject headings 38 or subjects 40 are selected from the subject taxonomy 36, then the exemplary embodiment will perform the search set forth in the search query from a federated group of Web search engines (such as "MSN", "LYCOS", "TEOMA", etc.) and display the results of the search on the screen in order based upon relevance of the documents from the search results in comparison to the subject of the search query. Additionally, the exemplary embodiment also analyzes the search query to determine a subject matter (or subject matters) of the query and provides links to the subsets of information sources 44 (in the form of hyperlinks) associated with the subject matter(s) determined from the search query above the general search results. If the user selects the identified subsets of information sources 44, the system will perform the same search in the sub-set of information sources. Exemplary methods for identifying the subject matters from the search query 34 are discussed in further detail below. In the example shown in FIG. 3, the search query "cjd" was identified by the system as being related to the specific subject matters, "Health tips", "Health news" and "Health discussions". The system was able to make this recommendation based upon analyzing the query and identifying that the closest subject heading that it corresponded to was health; hence, the recommendation from the system that this search be conducted within "health-related" sources.

Figure 4:
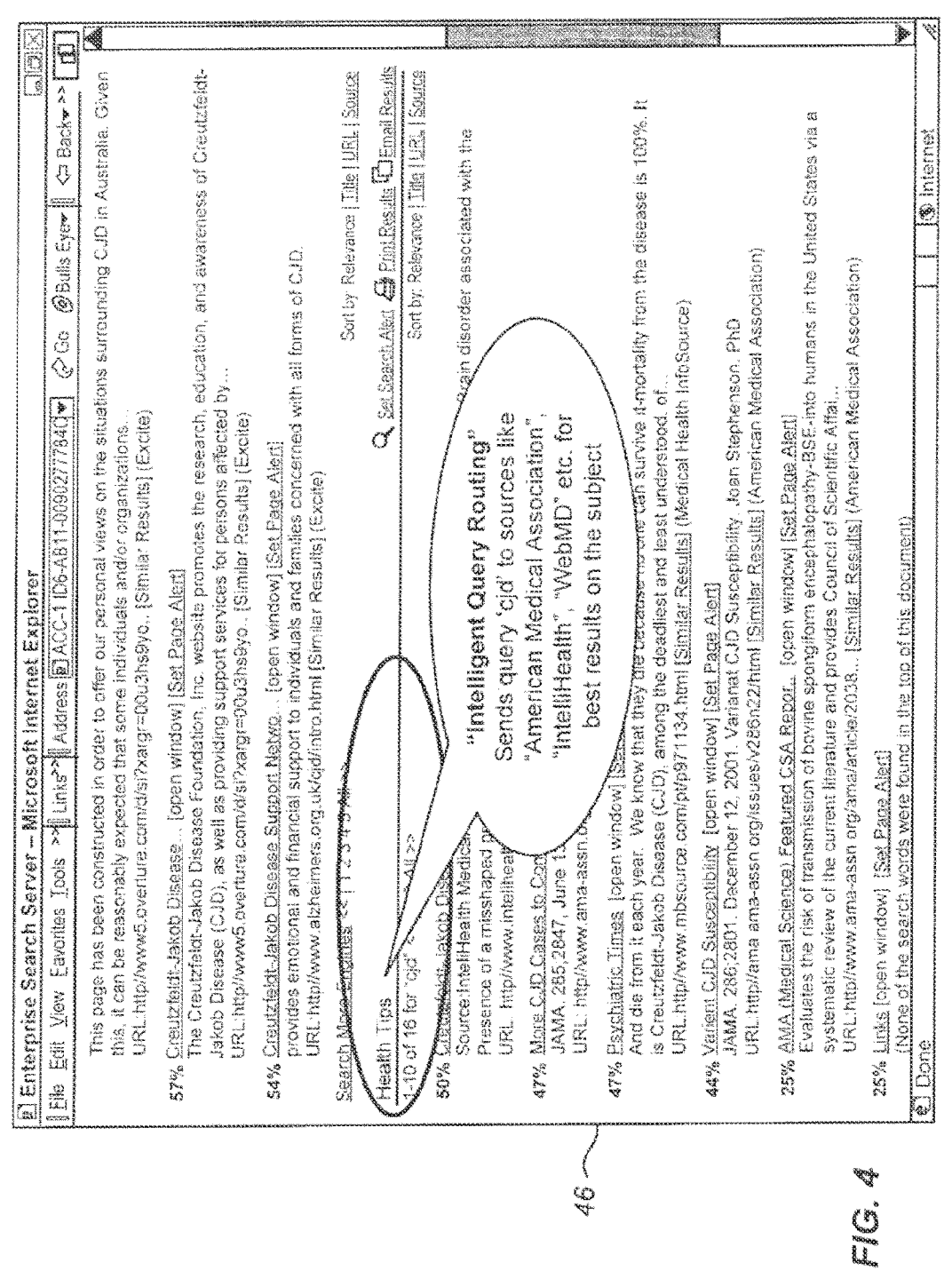

As shown in FIG. 4, when a general search is requested, the exemplary embodiment may also be configured to automatically perform the search within a sub-set of information sources corresponding to a subject matter matching the search query. The display 46 shown in FIG. 4 illustrates that the specific search for the search query "cjd" was automatically conducted within the sub-set of information sources associated with the "Health Tips" subject matter. The search results resulting from this specific search may come from information sources such as "American Medical Association", "Intellihealth", and "WebMD", etc. for the best results on the subject.

Figure 6:
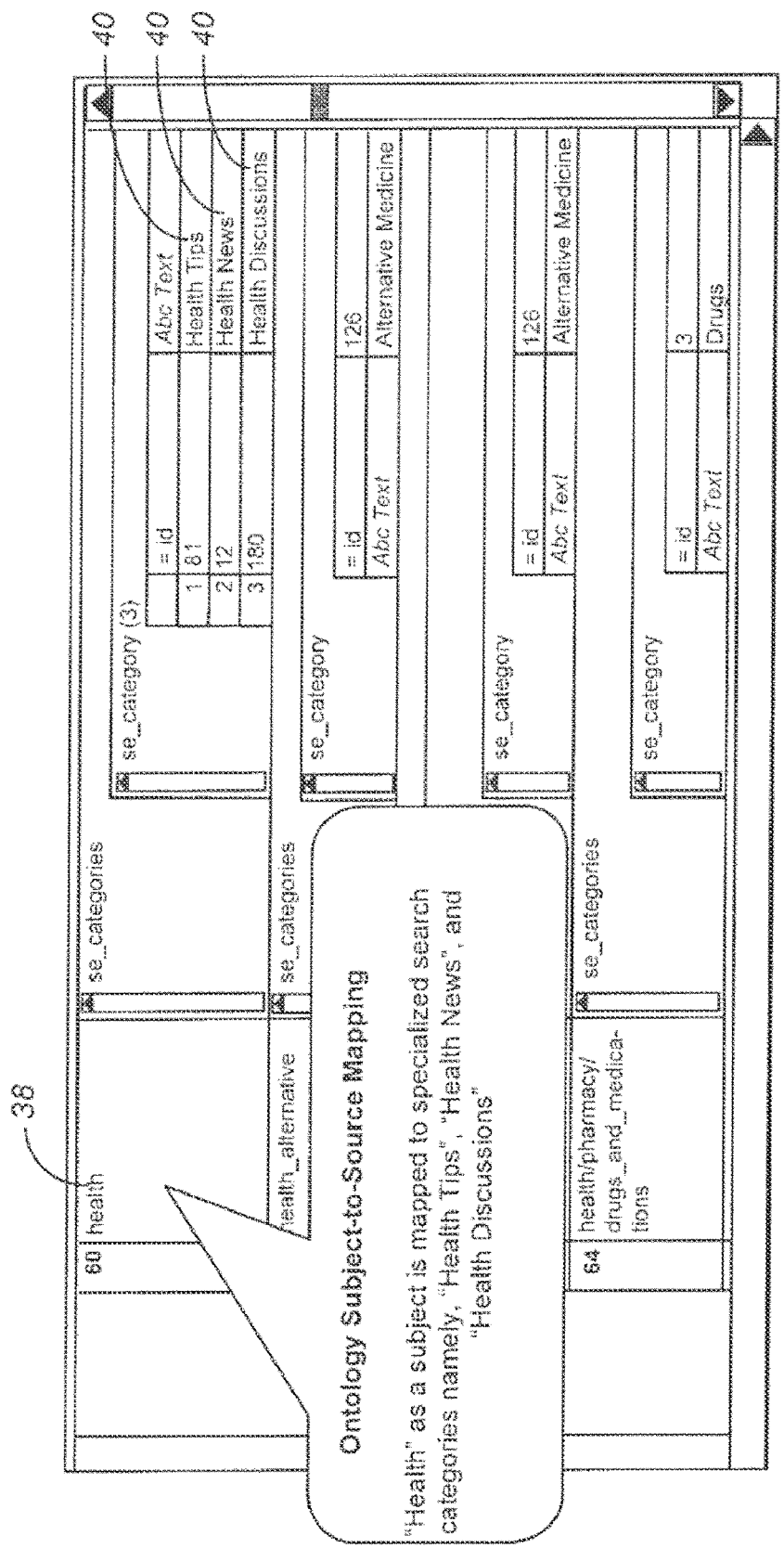
FIG. 6 is an illustration of a structure of mapping subjects to information sources, maintained in XML file, of the exemplary embodiment.

FIG. 5 illustrates the exemplary structure of the source taxonomy 36, and FIG. 6 illustrates the exemplary subject-to-source map 42 (also referred to, herein, as a category-to-source map). As discussed above, the subject-to-source map 42 is used to identify one or more information sources corresponding to identified subject matters of the search query, to allow for more focused searching of the subject matter in these sources. The subject-to-source map 42, in the exemplary embodiment, is arranged as a hierarchy that includes an upper level of subject headings 38 (such as "health"), and for each subject heading 38 there are one or more information source subsets 41 such as "health news", "health publications", "health tips", and "alternative medicine" linked thereto. Finally, for information source subset 41, there are linked to it one or more information sources 48. For example, the specific subject "health tips" will have linked to it information sources such as "American Medical Association", "Intellihealth.com", "WebMD.com", etc.

FIG. 6 more specifically illustrates how a subject in the ontology is mapped to a group of sources or to a single source by an administrator in the exemplary embodiment. Health as a general subject 38 may be mapped to a group of searchable sources 40 called "health tips". The more narrow subjects under the general subject "health", such as "cancer", may be mapped to specialized sources providing information on cancer treatment, cancer trials, etc. The ability to map the subject headers and specific subjects to information source(s) is completely flexible and can be tuned to the needs of the specific search scenario in which the system will be used.

Figure 7:
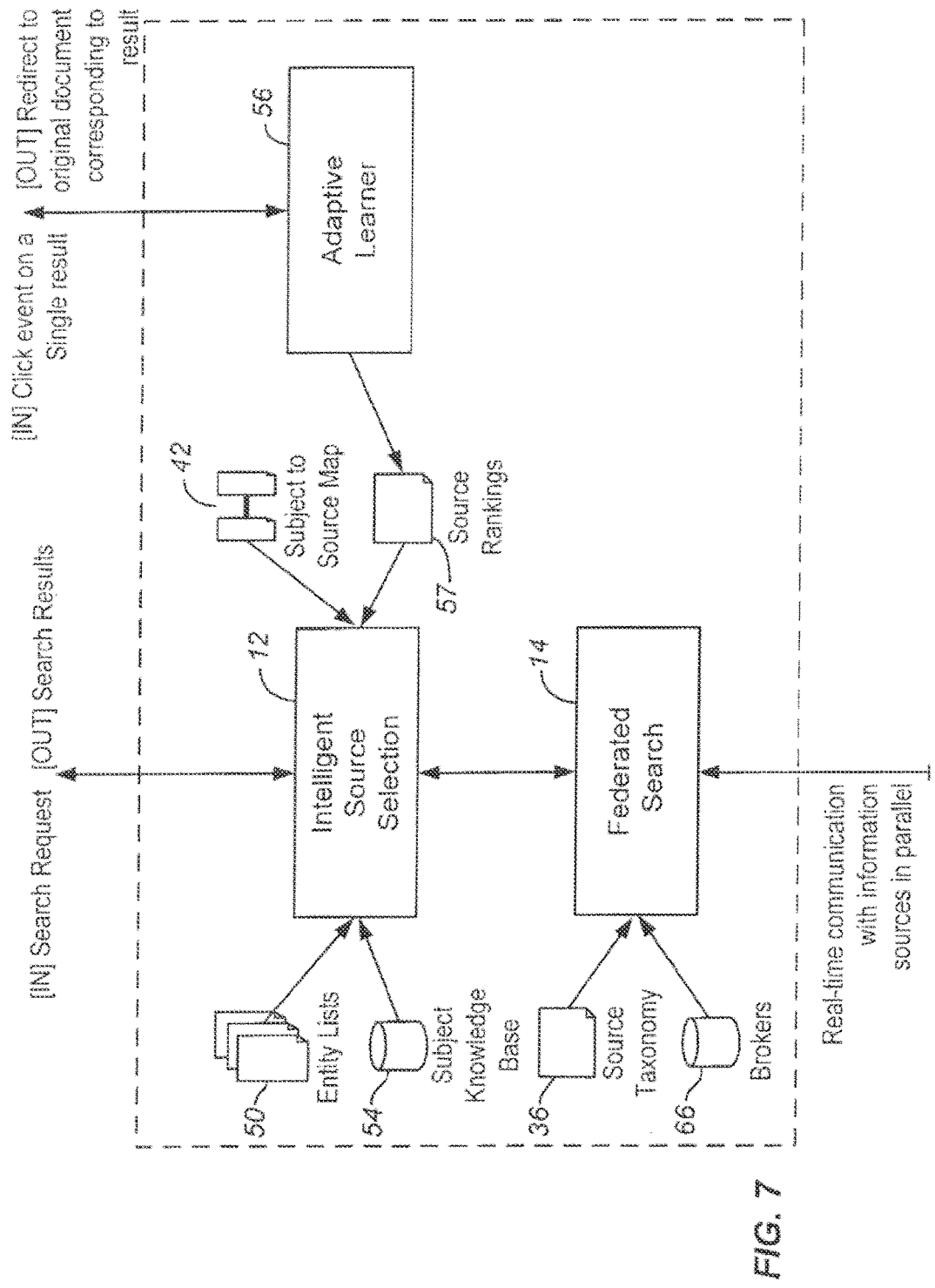
FIG. 7 is a block diagram representation of the interplay between the intelligent source selection, federated search and adaptive learner functions of the exemplary embodiment.

Referring to FIG. 7, as discussed above, the intelligent source selection function 12 utilizes a query analysis algorithm to determine a subject matter or subject matters of the search query, where such identified subject matters are used to help the user identify specific sub-sets of information sources to perform more focused searches. Generally, the query analysis algorithm uses a combination of deterministic look-ups within a group of provided entities lists 50 along with fuzzy look-ups ("auto-categorization") within a knowledge-base 54 to determine within a certain degree of confidence the subject matter of the query. Then, based upon the determined subject matter(s), subsets of information sources can be provided for these subject matter(s) using the subject-to-source map 42.

Figure 8:
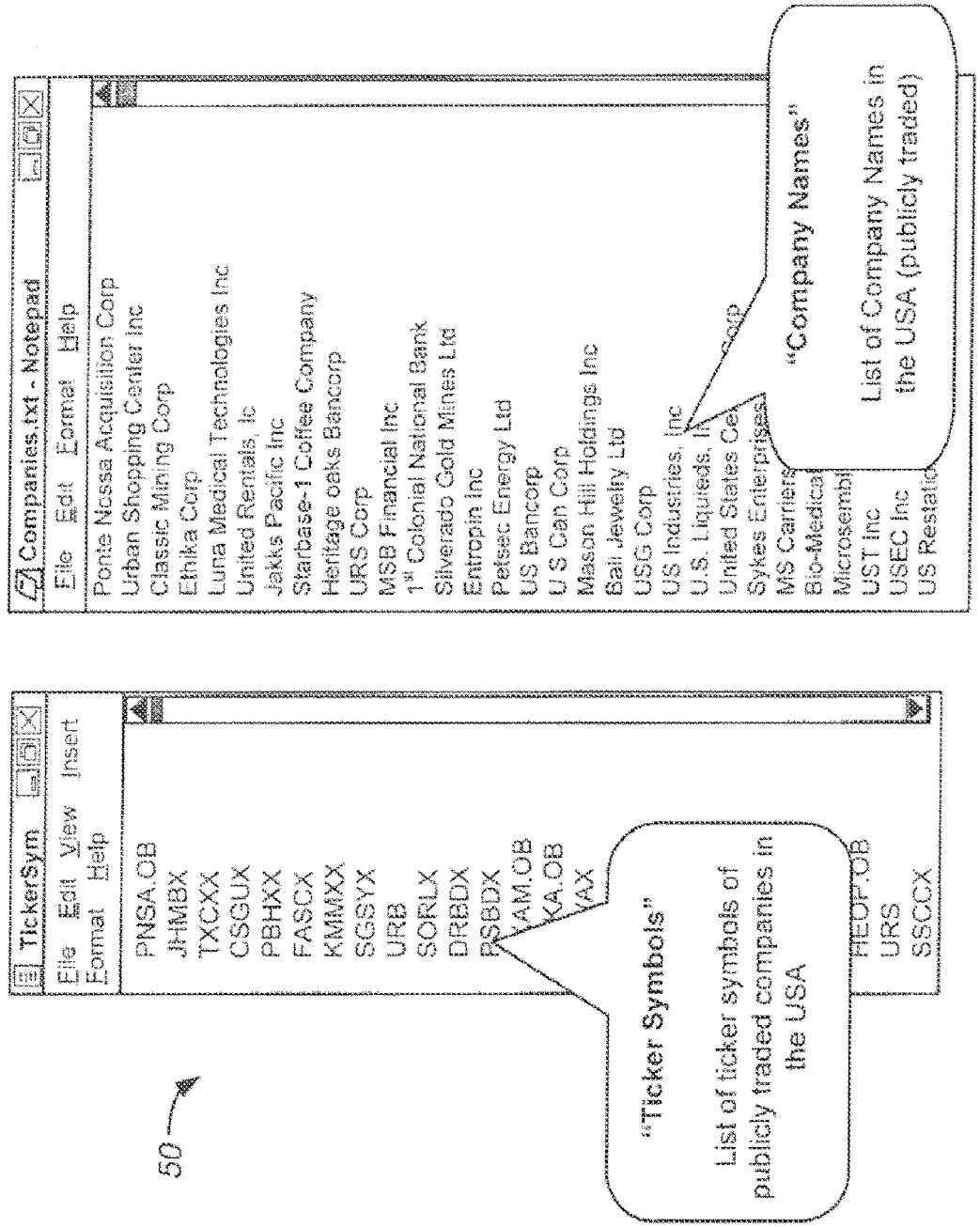
FIG. 8 is an illustration of example entity lists according to the exemplary embodiment.

Examples of entity lists 50 can be found in FIG. 8. For example, an entity list can include a list of ticker symbols or an entity list can include a list of company names. Other representative entity lists could be, for example, health conditions, places, sports, etc. Generally, an entity list 50 is a list of words, names, or other terms that collectively fail under a general subject heading 38 or fall under a specific subject 40. As will be discussed in further detail below, the more general entity lists are referred in the exemplary embodiment as "fall through" lists (having a lower confidence level) and the more specific entity lists are referred to as non-fall through lists (having a higher confidence level).

FIG. 9 provides an example entity list-to-source mapping 52 which maps certain entity lists directly to specific subject matters. For example, the mapping shown in FIG. 9 includes the entity list "places" mapped to the specific subject matters "maps", "travel guides", "almanacs", and "encyclopedias". Additionally, the entity list "ticker symbols" is mapped to the subjects "financial discussions", "financial tips", "company profiles", "SEC filings", and "mutual funds".

Figure 10:
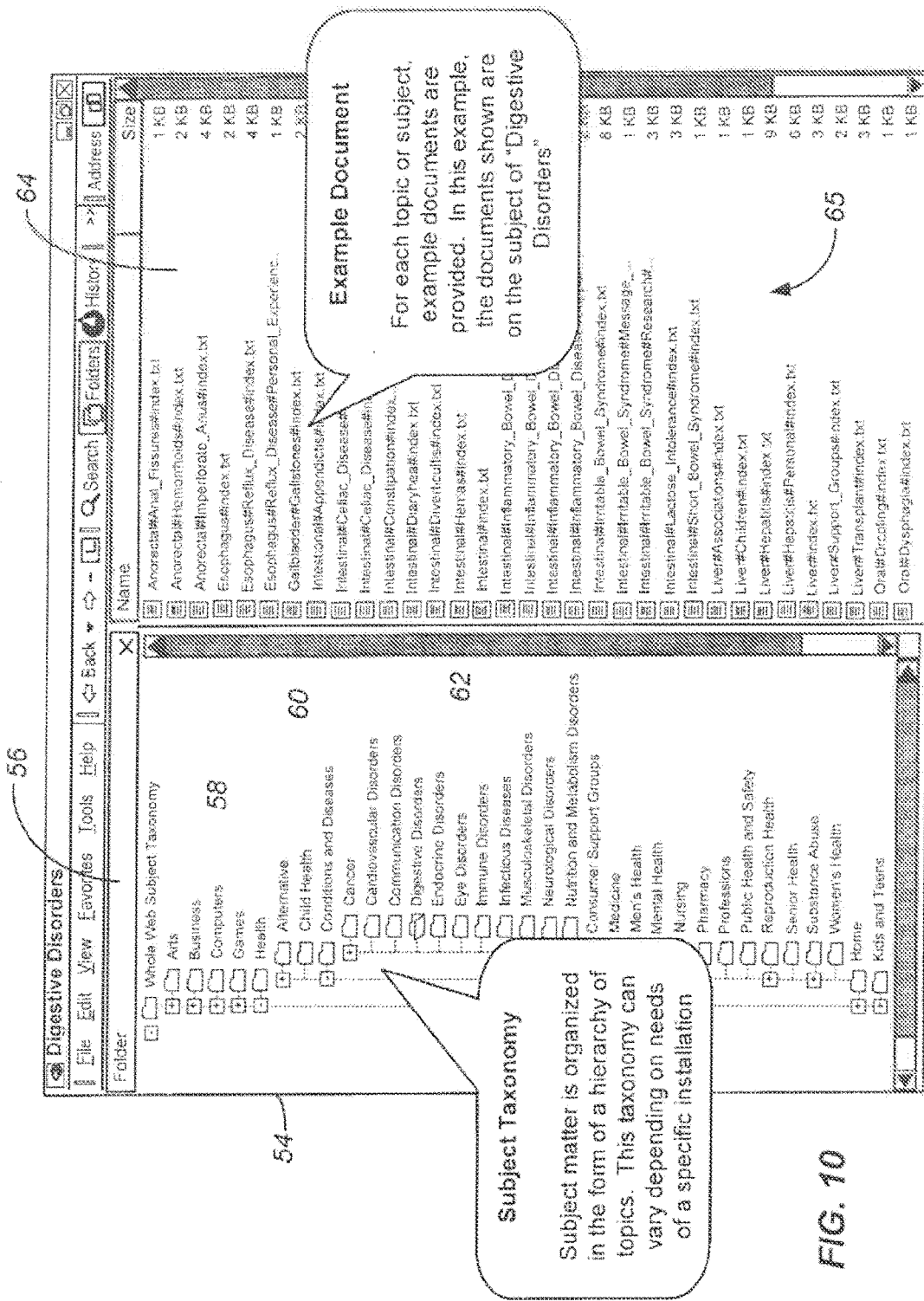
FIG. 10 is an illustration of a subject taxonomy and example documents linked to the subjects in the subject taxonomy, according to the exemplary embodiment.

Referring again to FIG. 7, as mentioned above, the fuzzy look-up step involves a "digital fingerprint" match of terms in the search query with "digital fingerprint" of topics in a subject knowledge-base 54. This methodology is referred to as "auto-categorization", emanating from the problem of trying to "automatically" find the "category" in a taxonomy that a stream of input text corresponds to. An example of the knowledge-base is shown in FIG. 10. The left pane 56 in the display illustrates a subject hierarchy labeled the "Whole Web Subject Taxonomy". The first level 58 in the hierarchy are the general subject headings such as "Health", the next level 60 in the hierarchy includes more specific subject headings such as "Alternative", "Child Health", and "Conditions and Diseases" and the most specific level 62 in the hierarchy includes very specific subject matters such as "Cancer", "Cardio-Vascular Disorders", "Communication Disorders", "Digestive Disorders", etc., which are specific subjects of the "Conditions and Diseases" subject heading in the second tier 60. The right pane 64 of the display provides a list of example documents 65 identified by the administrator as being relevant to the selected subject, "Digestive Disorders", in the specific level 62 of the subject hierarchy 56.

Therefore, once the taxonomy of subjects 56 is created and example documents 65 are provided to represent content typically found for each subject, the system will then learn from these example documents to create the knowledge-base 54 of subject matter representing the ontology. In the general sense, the knowledge-base includes a list of words, phrases or other terms "learned" from the example documents provided for each subject. Generally, the methodology for "learning" from a taxonomy of subjects and example documents for each subject, is based upon creating topic or subject specific "digital fingerprints" using the familiar vector-space model for analyzing and representing a body of unstructured texts. The "digital fingerprints" for topics are, in essence, weighted vectors of terms (words and phrases) that best represent information most likely to be found in those specific topics. This "digital fingerprint" information is then stored in the "subject knowledge-base" for enabling the query analysis.

More specifically, in the vector-space algorithm, a vector-space model is trained off-line by parsing the collection of example documents for each subject to generate a representative vector of terms and frequencies for that subject. In the implementation of the exemplary embodiment, the terms identified can be individual words or phrases (phrases are determined via a measure known as mutual information). Typically, the subject matter vectors are normalized in some fashion, to account for variation in the size and number of training documents. In addition, a uniqueness score is calculated for each term associated with a given subject. This uniqueness score is often referred to as "IDF" for "inverse document frequency" since one over the number of documents that a term appears in is one way to measure uniqueness. In the present exemplary embodiment, the uniqueness score is one over the total of all normalized category vector weights for that term. To classify texts, a vector-space classifier parses the text to be classified to generate the vector of terms in frequencies. This vector is compared with the vectors computed off-line for each subject matter, taking into account the uniqueness of each term. In the implementation of the exemplary embodiment, for each subject matter that has a non-zero normalized weight for all terms in the text vector, and for each term in the text, the term frequency from the text is multiplied with the normalized weight for the subject matter, then that value is multiplied by the uniqueness score for the term exponentiated by a configurable constant. These values are summed to give a score for each subject matter. The resulting values determine which subject matters best match the text.

In the exemplary embodiment, the search query analysis program operates substantially as follows. Given a user's search query, at least portions of the search query (i.e., after possibly eliminating stock words, and/or after stemming remaining words to root form) are compared against zero or more of the entity lists 50, each of which may be stored in RAM as a dictionary. As discussed above, the general entity lists (having lower confidence levels) are designated fall-through lists, while the more specific entity lists (having a higher confidence value) are designated non-fall-through lists. Accordingly, the fall-through lists are assigned a confidence score of 1.0 and the non-fall-through lists are assigned confidence scores of 1.5. If the search query is matched with one or more of the non-fall-through lists, then the exemplary embodiment does not perform the "auto-categorization" of the search query; however, if not found in a non-fall-through list, then the query is compared against the "fingerprints" in the knowledge-base 54 to identify subject matters corresponding to the "fingerprint" of the search query. Any matches in this comparison will be assigned confidence levels from 0 to 1 depending upon the confidence of the match. The subject matters developed from the auto-categorization step are added to the array of subject matters developed in the comparison with the entity lists above. At this point, there exists an array of subject matters (entity list names and subject headings from the knowledge-base) along with associated confidence levels, where the array is sorted by the confidence level. Each entry in the subject matter array is linked to a sub-set of information sources using the subject-to-source map 42 as discussed above. In the exemplary embodiment, if a particular subject category from the array is not found in the subject-to-source map 42, the parent category will be checked for a sub-set of information sources. For example, if the subject matter heading "health/conditions&diseases/digestive_disorders" is not found, then a look-up will be made for "health/conditions&diseases". This step is repeated until a sub-set of information sources is matched to the subject matter (i.e., if "health/conditions&diseases" is not matched with a sub-set of information sources, then a look-up will be made for the general heading of "health"). Thus, an array of searchable information source groups associated with the array of subject matters and associated confidence levels has been constructed.

Furthermore, each information source in each respective sub-set of information sources may also be ranked with respect to each other utilizing the adaptive learner function 56. Generally speaking, the adaptive learner function 56 provides a method for prioritizing the information sources by rating (in real-time) the information sources based upon the popularity of the source or upon other performance or statistical considerations (or combinations thereof) to provide performance scores 57 for the information sources. The adaptive learner process is a means to learn the on-going performance of sources (in the manner in which they return relevant results to users on various subjects), so that the intelligent source selection function 12 continually improves and keeps pace with the changing content or behavior of the individual sources. From a simplistic perspective, this method simply rates the up-to-minute popularity of each source for each subject in the ontology.

As shown in FIG. 11, an internal database 58 maintains internal ranking of the performance of sources in specific subject areas. For example, the highlighted source in FIG. 11 "Mayo health" database has been rated the best performing source by the system having a performance score 57 of 0.61. Some of the performance criteria utilized in adjusting this performance score include: (a) adjusting the performance score based upon the number of times users access the source from search result listings; (b) adjusting the score based upon the amount of time spent on each source; (c) adjusting the score based upon access problems or performance of the source (such as, lowering the score if users have trouble accessing the source at various times); and (d) adjusting the score based upon user feedback, such as through questionnaires or rating polls. The impact of the adaptive learner function 56 is not typically instantaneous to start with. Depending on the subject-spread of the queries being performed, the source is put to use, and the volume of users and queries, the adaptive learner process 56, over time, provides a reasonably accurate measure of the performance of specific sources on specific subjects.

As mentioned above, the adaptive learner process 56 gauges the "popularity" of a particular information source for a particular subject measured, in the exemplary embodiment, through result "click-throughs" from the community of users. The result links returned from the federated search function 14 are directed to a "click-through" handler when activated by a user. The "click-through" handler redirects the user's browser to the actual result after optionally updating the per-source category weights for the information sources that returned the result. Optionally, the per-source category weights can be adjusted by the "click-through" handler periodically (i.e., every 14th access) to reduce the rate of change. In the exemplary embodiment, each result link returned from the federated search function 14 include the following: the original result link; a list of the information sources that returned the result; the ESS query; and a list of the subjects assigned to the search query.

In addition to the "click-through" handling described above, the following measures can also be used to stabilize the "learning loop".

1. Measure the duration of time the user spent looking at/reading through a give result document and use this to discern the "usefulness" of the document to the user, and by correlation, the usefulness of the information source that returned that document for the subject corresponding to the search query;

2. Categorize the result document matched up with the subject corresponding to the user's search query; and/or 3 Assign a penalty (something the would reduce the weight value) to information sources, or are slow to respond periodically.

Referring again to FIG. 7, the federated search function 14 performs the substantially parallel real-time searches on the plurality of information sources. The federated search function 14 utilizes brokers 66 which are electronic definitions stored on the system that define for each of the information sources to the federated search function 14 how to interface with the respective information source; for example, how the federated search function 14 is to communicate with the information source, bow the federated search function is to structure its queries (in its native form) to the specific information source, how the federated search function 14 interprets results from the particular information source, how the federated search function is to navigate through multiple "pages" of the results set from the specific information source, any security methods used by the particular information source, etc. An example broker definition for the Intellihealth.com information source is provided in FIG. 12.

The present invention also makes it possible for non-operational brokers (brokers can become non-operational if the information source they correspond to ceases to exist, moves to a different location, delivers different content, delivers content in a different format, has new capabilities for search and retrieval, has new security structures, etc.) to be healed automatically through an automated background testing process.

As mentioned above, the brokers 66 can provide the security parameters and credentials necessary for federated search system to access a secure or subscription information source or sources 22. Consequently, the present invention also provides a security handling architecture that enables the system to proxy user credentials for multiple users to multiple secure sources using multiple security methods in real-time.

Figure 13:
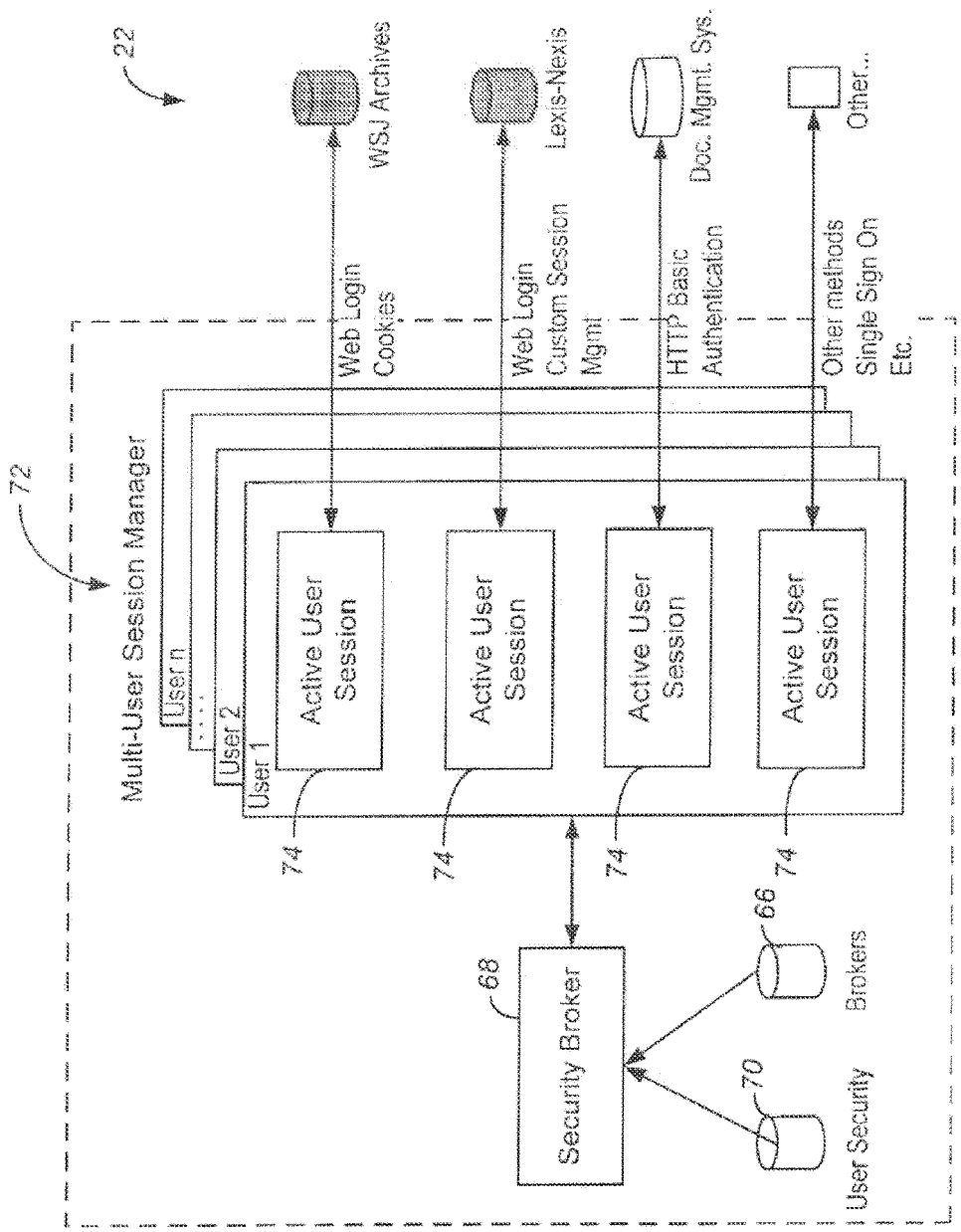
FIG. 13 a block diagram representation of the multi-user, multi-source, multi-modal secure information source architecture according to the exemplary embodiment.

As shown in FIG. 13, the multi-user, multi-source, multi-modal security architecture utilizes a security broker function 68 within the federated search system that utilizes user security information 70 and security parameters embedded within the brokers 66 to drive the multi-user session manager 72. The multi-user session manager 72 creates an active user session 74 for each secure source 22 respectively accessed by each user. Therefore, if, for example, WSJ Archives are accessed by thirty-three of the active users, then thirty-three active user sessions 74 will be created for each individual access.

The security broker 68 is invoked during the federated search function 14 for each secure information source in the search request. The security broker 68 examines the broker definition 66 to determine the type of authentication (e.g., basic authentication, challenge-response, log-in form, etc.) required by the secure information source 22. For secure information sources that use a log-in form, the broker definition 66 will also describe the log-in parameters used by the information source. Next, the security broker 68 retrieves the authentication credentials 70 assigned to the user for the secure information source. This information is stored in the user security database 70. Using the combined information, the security broker 68 performs the initial steps in the establishment of the per-user session and verifies that the session has been successfully initialized. If the secure information source uses session parameters, the security broker 68 extracts the parameters from the response and stores them in the respective active user session 74. From this point on, the federated search process 14 proceeds normally. If the secure information source 22 uses session parameters, the security broker 68 will be re-invoked at each step in the search process to transmit the appropriate session parameters for the respective active user session 74. As discussed above, the session manager 72 is responsible for maintaining a separate active user session 74 for each user/source combination. Separate "session parameters" are maintained by the session manager 72 for each active user session 74. FIG. 14 illustrates the conceptual organization of the internal security information structure maintained by the session manager.

As shown in FIG. 14, session parameters are stored in "Session Details" records and state is managed for each secure source searched by each user in real-time. Such session parameters may include, cookies, session parameters, session IDs, sessions date, etc. The session parameters will vary depending upon the mode, type of security encountered at each secure source. Using this dynamic security information structure, the session manager 72 maintains the integrity of the unique security requirements at each secure source 22 in a multi-user environment, while at the same time, not compromising a user's privacy of individual security requirements. It should be understood that it is within the scope of the invention that at least certain of the security credentials and/or session parameters may be shared by certain users (or groups of users) during the accessing and/or searching steps. These shared credentials/parameters may be included in the "Session Details" records for each user or in a shared record accessible for all users sharing the credentials/parameters.

Figure 15:
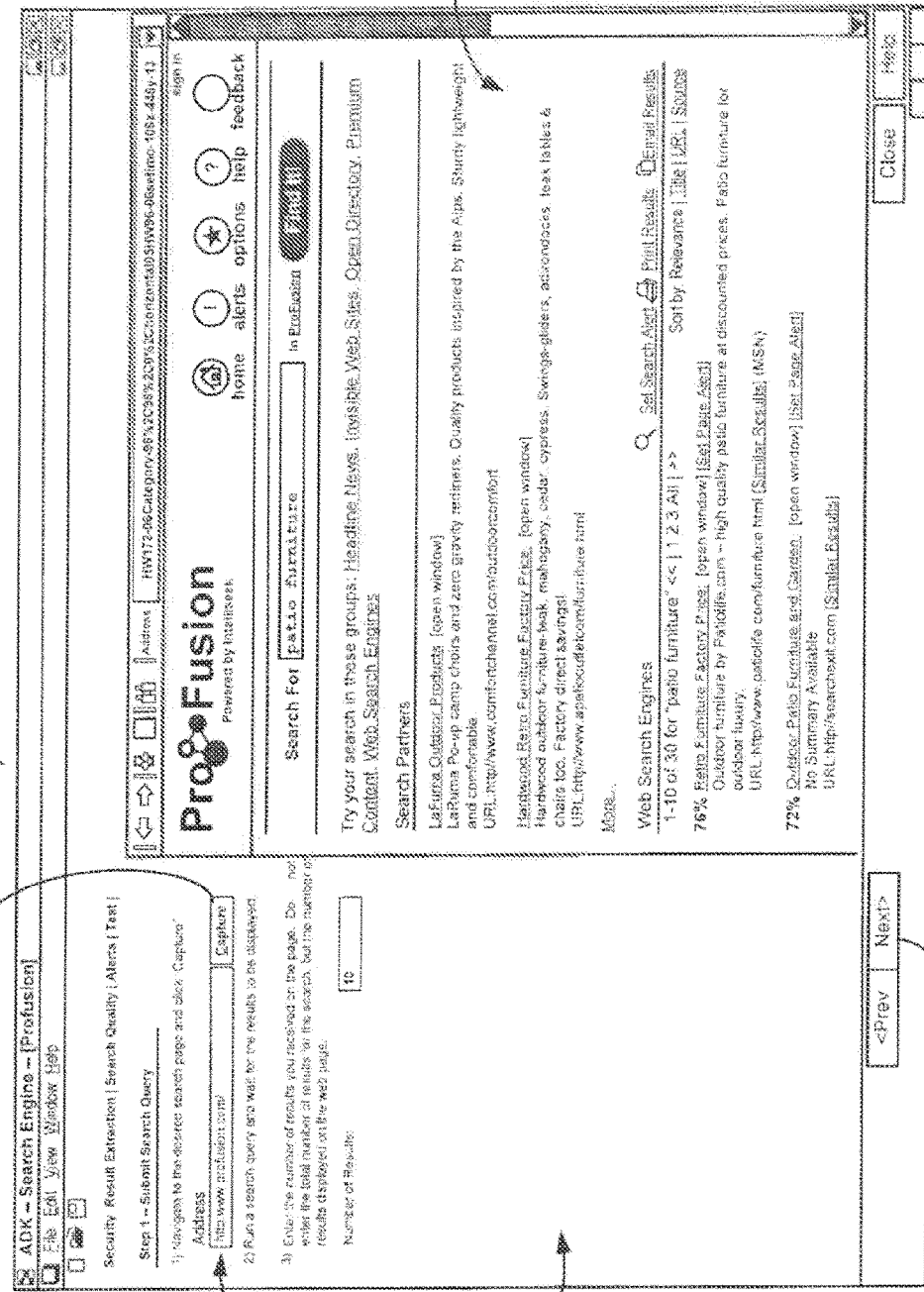
FIG. 15 is an example screen shot of the exemplary embodiment illustrating an initial stage of the broker-definition tool.

FIG. 15 illustrates a visual broker-definition tool 76 (referred to as the "Agent Development Kit" or "ADK") that provides the exemplary embodiment of the present invention with the ability to create the brokers 66 for the information sources using a substantially automated process. This broker-definition tool 76 automatically analyzes the structure and form from the search result content generated by a searchable information source to determine patterns that exist within it; and automatically generates the necessary pattern extraction logic for the broker substantially without any user involvement. The broker-definition tool 76, in this exemplary embodiment, utilizes familiar "wizards" interface in a left pane 78 to guide the user rapidly through the broker generation process. The right pane 80 provides visual results of the information source search result output or of the broker output. As can be seen in FIG. 15, the interface pane 78 first requests that the user enter the information source address in field 82 and activate the "Capture" icon 84. In the right pane 80 the graphical interface for the selected information source is presented. Next, the interface 78 requests that the user run a search query on the requested information source and wait for the results to be displayed. As can be seen in the right pane 80 on FIG. 15, the user has requested a search for documents related to "patio furniture". Finally, this interface 78 requests that the user enter the number of results received on the page shown in the pane 80. When these three steps are completed, the user activates the "Next" icon 86.

Figure 16:
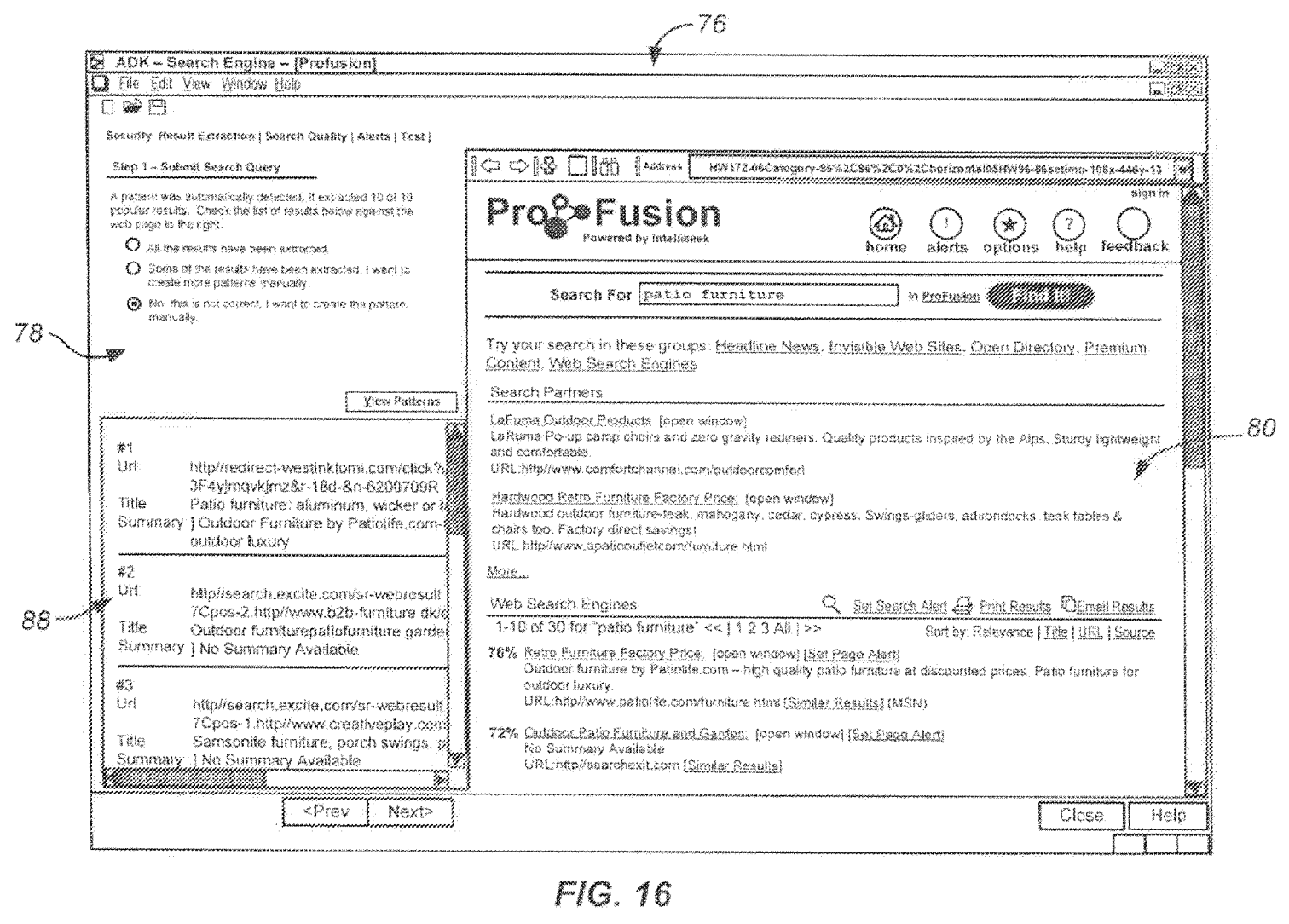

Referring to FIG. 16, the broker-definition tool 76 then automatically extracts search results 88 from the search results generated by the information source shown in the pane 80. The broker-definition tool accomplishes this utilizing automatic pattern detection, extraction and generation. The basis for this process can be understood by noting that virtually every searchable source provides its search output through a program-generated HTML page. Inherent in this observation is the fact that program-generated pages (especially where repeating elements are included, like a series of search results) have some pattern driving its production. This makes it possible, in most cases, to put together a methodology to find that pattern, and generate logic to extract it. Consequently, the broker-definition tool extracts the search results from the information source, generally, using the following methodology; first, the HTML document corresponding to the result page shown in the pane 80 is saved locally to a file; next, the file is parsed utilizing a specialized parser that distills the "structure" of the page (locating tables, paragraphs, divisions, etc.) from the "cosmetics" of the page (what font is being used, what color is being used, where an image is inserted, etc.); next, with this distilled structure of the page, the broker-definition tool proceeds to find "blocks" of structure (paragraphs, table rows, tables, etc.) repeating some minimum number of times (the broker-definition tool takes the input provided by the user on the previous page answering the question "enter the number of results you received on the page."); next, if at least some minimum number of repeating blocks are discovered, then the broker-definition tool looks to see that these blocks contain some essential elements that are typical of search results ("essential elements", for example, are fields or entities such as a URL—a link to a detailed record, a title—a brief title of the individual results, a date, a summary, etc.); next, if the blocks have been found to contain at least some of these essential elements, the broker-definition tool proceeds to create "regular expressions for each of these fields" and one for the blocks representing the result record; with the regular expressions in place, the broker-definition tool proceeds to apply the regular expression on the text of the original result page and extracts only those portions of the text that correspond to the result records and fields contained within them; finally, these extracted results are then displayed in the left pane 88 as shown in FIG. 16.

A "regular expression" is a classic computer science device utilized to "extract" the desired portion of text or other information from a larger stream of text. See http://www.python.org/doc/lib/re-syntax.html or http://msdn.microsoft- .com/library/default.asp?url=/library/en-us/scrip56/html/is56isgrpRegExpSyntax.asp for more information on regular expressions. Typically, regular expressions have been created by advanced/power users or developers for solving information extraction problems. The broker-definition tool methodology takes this powerful method and makes it work in a simple visual interface.

If the broker-definition tool 76 is successful in performing the automatic pattern detection, regular expression generation and result extraction for every single source available, then the broker generation process could indeed become 100% automatic. Nevertheless, the process is semi-automated because there are typically situations where there are exceptions that cannot be dealt with automatically by the broker-definition tool such as, for example: when unique fields of information exist within the result records, (for example, a thumbnail picture, a price, a delivery date, etc., that may all be specific to a search source, these need to be specified by the user and then the broker-definition tool can generate the expressions for them); and when the search result records vary in structure for each record (for example, the source may optionally include, for example, a special discount price only for a few of the returned records).

Figure 17:
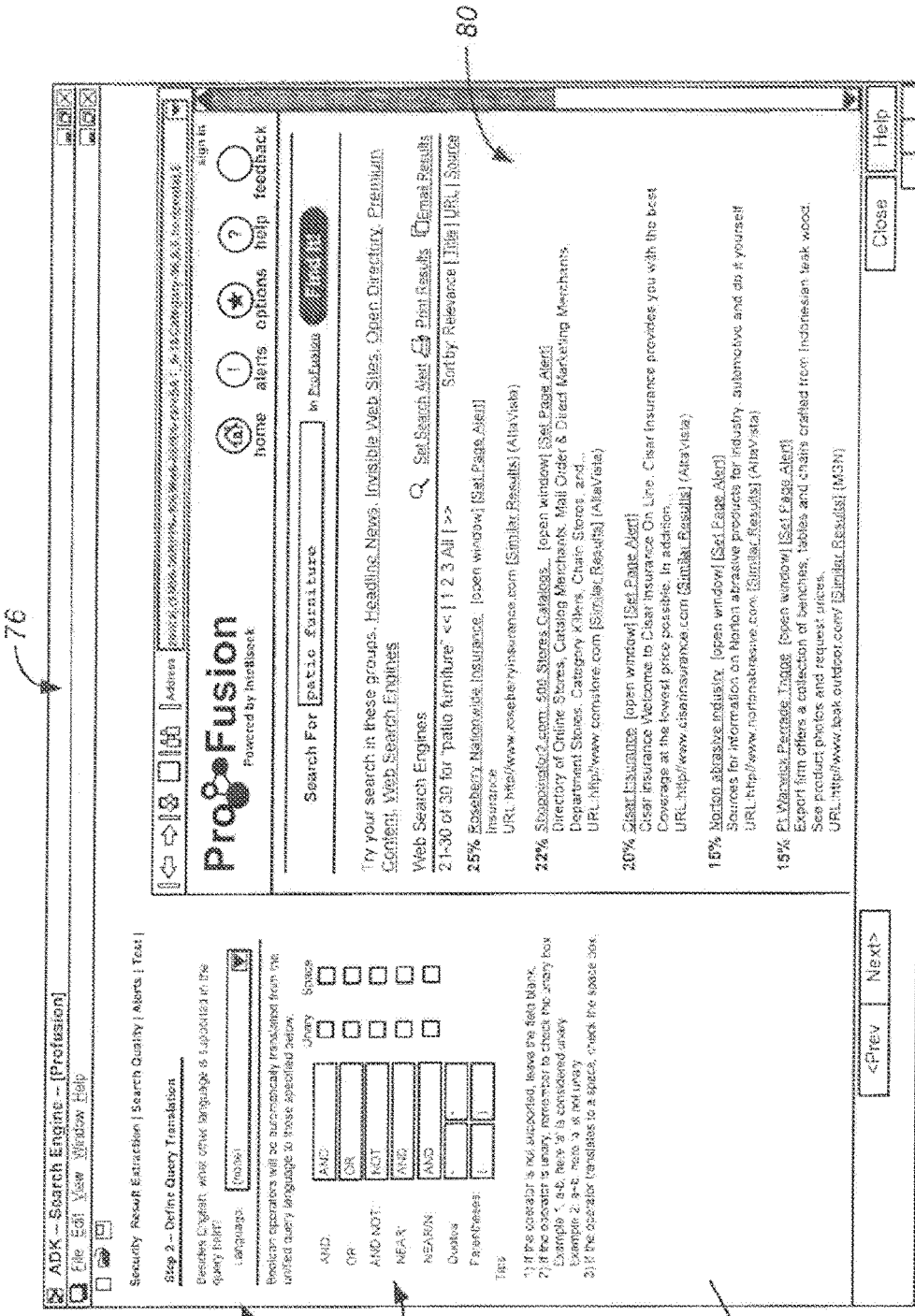
FIG. 17 is an example screen shot of the exemplary embodiment illustrating a query definition stage of the broker-definition tool.

FIG. 17 illustrates a source-specific "search query translation" in the interface 78 of the broker-definition tool 76 to enable universal searches to be conducted using a single query language to multiple disparate sources. As shown in FIG. 17, in the interface pane 78 the user is able to select alternate languages other than English that are supported in the information source's query field. Then, the interface provides fields 92 where the user can specify the symbols or terms used for the Boolean operations of a general search tool. Therefore, the system of the exemplary embodiment of the present invention implements capabilities such as searching for "all of the words", "any of the words", "phrase", "boolean". Boolean queries specifically allow users to combine terms using operators such as 'AND', 'OR', 'AND NOT', 'NEAR', 'NEAR/N' to accurately gather the type of information needed. Each information source, however, is equipped with different levels of capability for searching the information repositories they provide access to. Specifically, the query language syntax may vary widely. For example, in some sources, the search for <"pancreatic cancer" and "treatment protocol">
may be expressed as
<+"pancreatic cancer"+"treatment protocol">

This means that queries provided for federated searching by users need to be "translated" into the native syntax for each source by the brokers 66. This query translation is specified through the broker definition process, and it enables universal searches to be conducted using a single query language to multiple disparate sources.

Figure 18:
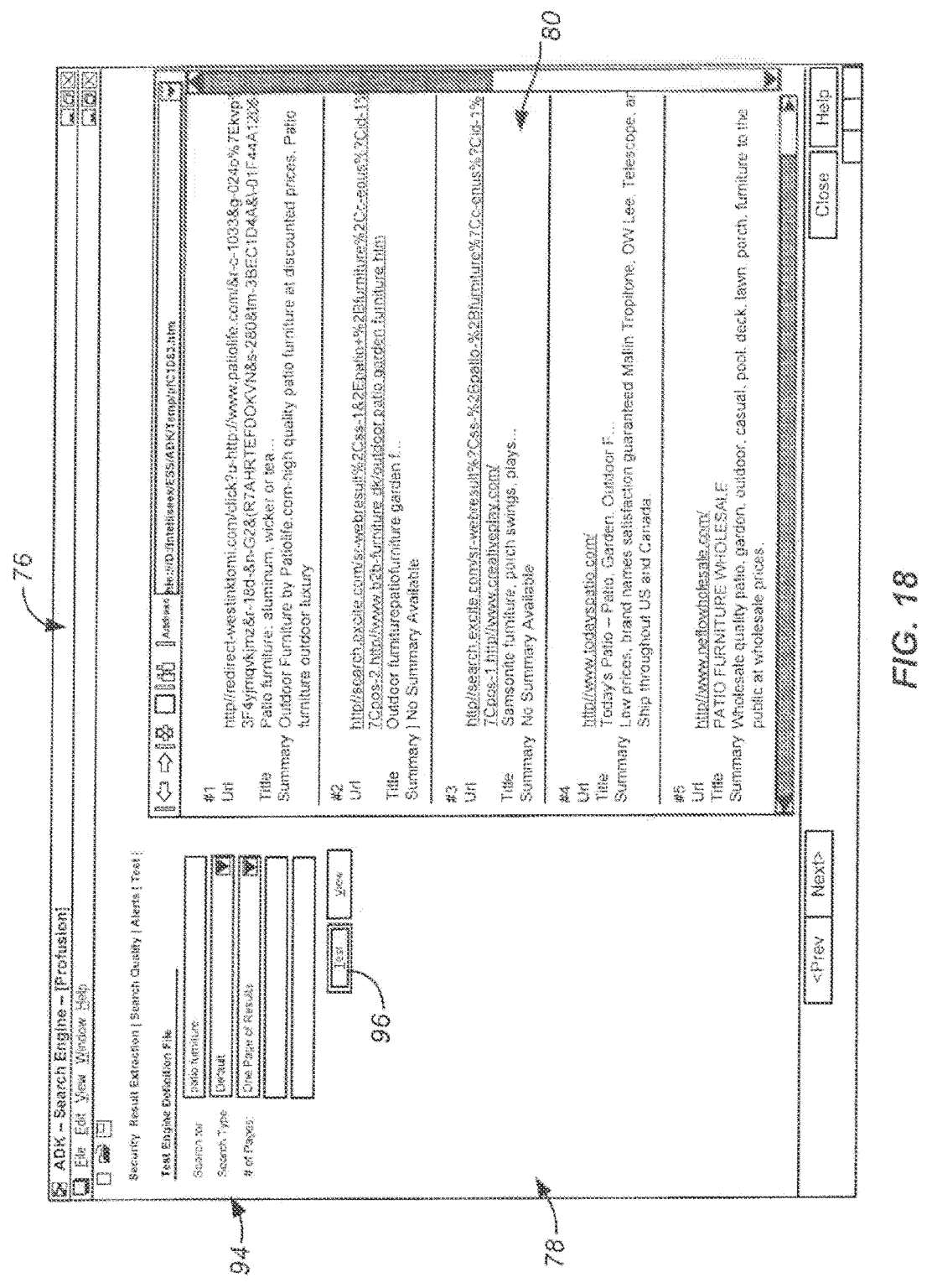

FIG. 18 illustrates a self-contained testing capability within the broker-definition tool 76 that permits a broker that has been created to be tested immediately. The interface pane 78 provides fields 94 for the user to enter a search query, a search type and list the number of pages in the results. These fields may also request a user name and password if the source is a secure source. Once these fields are filled in the user activates the "test icon" and a testing interface will actually perform a live query against the information source (for which the broker is being defined), just as the federated search function 14 would in the run-time system, and gathers the result data, and applies the broker definition to extract result records in all the defined fields of each result record. This extracted result set is presented in the right pane 80 to give instant feedback to the user on how well their broker definition is working and if it is ready for deploying to the run-time system.

Figure 19:
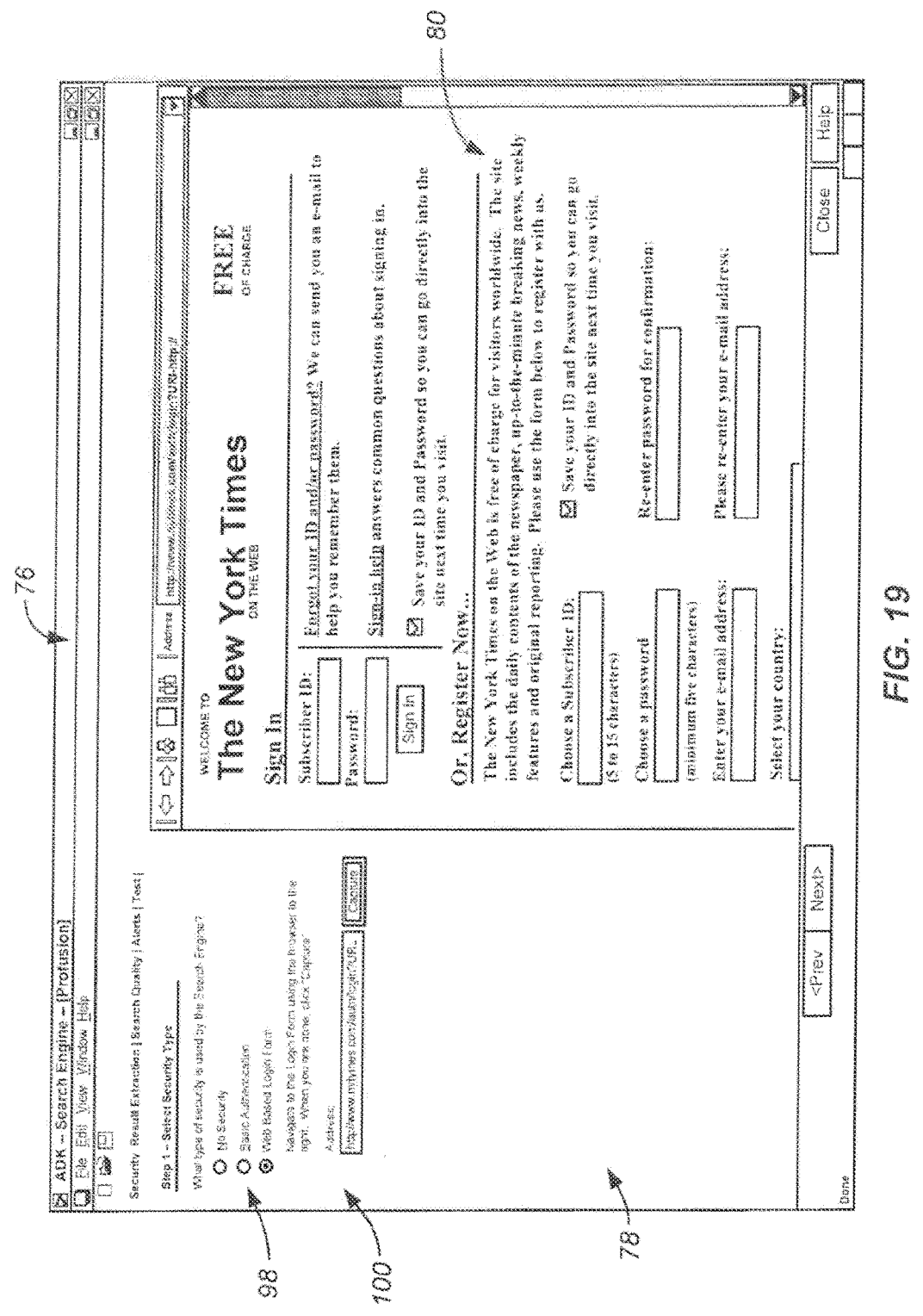

FIG. 19 illustrates how the broker-definition tool 76 is able to capture security information for a secure source. The broker definition can capture information by multiple security methods including the standard "HTTP basic authentication", and "web-based log-in forms". As shown in FIG. 19, the interface pane 78 includes a form 98 in which the user can identify the type of security that is being used by the search engine and a field 100 where the user enters the URL or address of the secure information source. Once the log-in page for the secure source is loaded into the right pane 80, the broker-definition tool captures the necessary log-in details, such navigating the log-in form, logging in, navigating to the search interface, etc., by "watching" (recoding) the user's interaction with the information source in the right pane 80. These security credentials will then be stored in the brokers 66 as discussed above. As also discussed above, the security broker 68 during the federated searching function 14 will essentially "replay" the log-in process to connect to the secure information source, and to supply the user's credentials for that source transparently, prior to performing a search. Nuances such handling session cookies that may be set for each user, by each secure source, are transparently handled by the security broker 68 at run-time.

Following from the above description and invention summaries, it should be apparent to those of ordinary skill in the art that, while the systems and processes herein described constitute exemplary embodiments of the present invention, it is to be understood that the invention is not limited to these precise systems and processes and that changes may be made therein without departing from the scope of the invention as defined by the claims. Additionally, it is to be understood that the invention is defined by the claims and it is not intended that any limitations or elements describing the exemplary embodiments set forth herein are to be incorporated into the meaning of the claims unless such limitations or elements are explicitly listed in the claims. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A computer implemented method for accessing information from a plurality of searchable information sources, comprising:
    analyzing a search query to determine subject matter of the query; and
    selecting a subset of information sources from the plurality of information sources based upon the subject matter of the query;
    wherein the subject matter of the query is derived by comparing the search query against a knowledge-base, the knowledge base including a taxonomy of subject matters and a set of terms for at least some of the respective subject matters, the set of terms representing information likely to be found in the respective subject matters, and wherein comparing includes comparing at least portions of the search query against the sets of terms in the knowledge base to determine the respective subject matters of matching terms.

2. The computer implemented method of claim 1, further comprising searching at least one information source in the subset of information sources for documents relevant to the search query.

3. The computer implemented method of claim 1, further comprising:
   comparing at least a portion of the search query against a plurality of entity lists;
   each entity list includes a list of phrases, each of the phrases corresponding to one or more subject matters; and
   wherein comparing includes matching a phrase in an entity list against at least a portion of the search query, and upon a match, returning subject matter corresponding to the match in the entity list.

4. The computer implemented method of claim 3, further comprising assigning a score to the subject matter by:
   assigning a confidence score to each entity list based upon a level of specificity of the respective entity list; and
   assigning a score to the subject matter corresponding to the confidence score of the entity list from which the subject matter was returned.

5. The computer implemented method of claim 1, further comprising building the knowledge base, wherein building includes:
   defining the taxonomy of subject matters;
   for at least some of the subject matters in the taxonomy, providing at least one example document that represents content typically found for the respective subject matter;
   generating a set of terms from the example document; and
   linking the set of terms to the respective subject matter.

6. The computer implemented method of claim 5, wherein the taxonomy is structured as a multi-tier hierarchy.

7. The computer implemented method of claim 6, wherein the multi-tier hierarchy includes a top-level tier of subject matter areas, at least one mid-level tier of subject matter categories for the respective subject matter areas, and at least one lower level tier of one or more elements taken from a group comprising (a) example documents for the respective subject matter categories, (b) a set of terms representing content typically found for the respective subject matter categories, and (c) entity lists corresponding to the respective subject matter categories.

8. The computer implemented method of claim 1, wherein comparing the search query against a knowledge-base further includes assigning a score to the determined subject matter based upon a confidence level of the comparison.

9. The computer implemented method of claim 8, further comprising determining a subject matter of the query by:
   displaying one or more of the subject matters having a score greater than a predetermined threshold; and
   selecting, by a user, at least one of the displayed subject matters.

10. The computer implemented method of claim 8, wherein analyzing includes determining a plurality of subject matters, and the method further comprises organizing the determined plurality of subject matters according, at least in part, to the scores assigned to the plurality of subject matters.

11. The computer implemented method of claim 1, wherein:
   another criteria includes comparing at least a portion of the search query against a plurality of entity lists;
   each entity list including a list of phrases corresponding to one or more subject matters; and
   wherein comparing includes matching a phrase in an entity list against at least a portion of the search query, and upon a match, returning a subject matter corresponding to the match in the entity list.

12. The computer implemented method of claim 1 wherein:
   comparing at least a portion of the search query against a knowledge-base further includes assigning a score to the subject matter based upon a confidence level of a comparison; and
   assigning a score to the subject matter determined by the comparison is based upon a confidence of the comparison.

13. The computer implemented method of claim 12, wherein scores resulting from the comparing at least a portion of the search query against a knowledge-base are lower than the scores resulting from comparing at least a portion of the search query against a plurality of entity lists.

14. The computer implemented method of claim 1, wherein analyzing determines a plurality of subject matters, and the method further includes organizing the determined plurality of subject matters according, at least in part, to the scores assigned to the plurality of subject matters.

15. A computer implemented method for accessing information from a plurality of searchable information sources, comprising:
   analyzing a search query to determine subject matter of the query; and
   selecting a subset of information sources from the plurality of information sources based upon the subject matter of the query;
   wherein the subject matter of the query is derived by comparing at least a portion of the search query against a plurality of entity lists, each entity list including a list of phrases, each of the phrases corresponding to one or more subject matters, and wherein comparing includes matching a phrase in an entity list against at least a portion of the search query, and upon a match, returning subject matter corresponding to the match in the entity list.

16. A computer system for accessing information from a plurality of searchable information sources, comprising:
   at least one data processor;
   memory for storing instructions causing the at least one data process to perform operations comprising:
      analyzing a search query to determine subject matter of the query; and
      selecting a subset of information sources from the plurality of information sources based upon the subject matter of the query;
   wherein the subject matter of the query is derived by comparing the search query against a knowledge-base, the knowledge base including a taxonomy of subject matters and a set of terms for at least some of the respective subject matters, the set of terms representing information likely to be found in the respective subject matters, and wherein comparing includes comparing at least portions of the search query against the sets of terms in the knowledge base to determine the respective subject matters of matching terms.

* * * * *

UNITED STATES PATENT AND TRADEMARK OFFICE
CERTIFICATE OF CORRECTION

PATENT NO. : 8,131,755 B2
APPLICATION NO. : 12/494181
DATED : March 6, 2012
INVENTOR(S) : Sundar Kadayam et al.

Page 1 of 1

It is certified that error appears in the above-identified patent and that said Letters Patent is hereby corrected as shown below:

On the Title page of the patent, at item [73] under "Assignee", delete

"SAP America, Inc., Newtown Square, PN,"

In its place, insert on the Title page of the patent, at item [73] under "Assignee", --SAP America, Inc., Newtown Square, PA--

Signed and Sealed this
Third Day of July, 2012

David J. Kappos
*Director of the United States Patent and Trademark Office*